(12) United States Patent
Iwai et al.

(10) Patent No.: US 9,130,862 B2
(45) Date of Patent: Sep. 8, 2015

(54) INFORMATION PROCESSING DEVICE USING DIRECT DATA ACCESS FROM CLOUD STORAGE

(71) Applicants: Hidetaka Iwai, Itami (JP); Hiroaki Sugimoto, Nagoya (JP); Shuji Yoneda, Osaka (JP); Kazuya Anezaki, Amagasaki (JP); Takeshi Maekawa, Amagasaki (JP)

(72) Inventors: Hidetaka Iwai, Itami (JP); Hiroaki Sugimoto, Nagoya (JP); Shuji Yoneda, Osaka (JP); Kazuya Anezaki, Amagasaki (JP); Takeshi Maekawa, Amagasaki (JP)

(73) Assignee: KONICA MINOLTA BUSINESS TECHNOLOGIES, INC., Chiyoda-Ku, Tokyo (JP)

( * ) Notice: Subject to any disclaimer, the term of this patent is extended or adjusted under 35 U.S.C. 154(b) by 197 days.

(21) Appl. No.: 13/786,741

(22) Filed: Mar. 6, 2013

(65) Prior Publication Data

US 2013/0246923 A1    Sep. 19, 2013

(30) Foreign Application Priority Data

Mar. 16, 2012 (JP) .................................. 2012-059582

(51) Int. Cl.
*G06F 3/00* (2006.01)
*H04L 12/24* (2006.01)
(Continued)

(52) U.S. Cl.
CPC .............. *H04L 41/22* (2013.01); *G06F 3/1204* (2013.01); *G06F 3/1253* (2013.01);
(Continued)

(58) Field of Classification Search
CPC ....... H04L 67/36; H04L 67/125; H04L 67/10; G06F 3/1204; G06F 3/1253; G06F 3/1288; G06F 3/1292; G06F 3/1236
USPC .......... 709/227, 229; 718/1; 455/456.2, 422.1
See application file for complete search history.

(56) References Cited

U.S. PATENT DOCUMENTS

2004/0097199 A1* 5/2004 Kawamura et al. ............. 455/91
2010/0302579 A1* 12/2010 Nuggehalli et al. ......... 358/1.15
(Continued)

FOREIGN PATENT DOCUMENTS

JP    2006-302145 A    11/2006
JP    2009-098903 A     5/2009

OTHER PUBLICATIONS

Provisional application of Detweiler Author: Detweiler Date filed: Apr. 11, 2011 U.S. Appl. No. 61/473,899.*
(Continued)

*Primary Examiner* — Boris Pesin
*Assistant Examiner* — Mandrita Brahmachari
(74) *Attorney, Agent, or Firm* — Buchanan Ingersoll & Rooney PC

(57) ABSTRACT

An information processing system comprising a communication terminal and an information processing device that allow communication therebetween. The communication terminal includes: a remote controlling part for acquiring an operation screen image, with which the user makes remote operation of the information processing device; and a cloud service connecting part for connecting to a service providing server providing a cloud service over a network, and acquiring a display screen image for using the cloud service from the service providing server in response to user's instruction, thereby causing the acquired display screen image to be displayed on the display part together with the operation screen image. The remote controlling part sends connecting information for connecting to the service providing server to the information processing device. The remote controlling part switches the display screen image displayed by the cloud service connecting part to the display screen image acquired by the information processing device.

32 Claims, 20 Drawing Sheets

(51) Int. Cl.
*H04L 29/08* (2006.01)
*G06F 3/12* (2006.01)
*H04N 1/00* (2006.01)

(52) U.S. Cl.
CPC .......... *G06F 3/1288* (2013.01); *G06F 3/1292* (2013.01); *H04L 67/10* (2013.01); *H04L 67/125* (2013.01); *H04L 67/36* (2013.01); *H04N 1/00344* (2013.01); *H04N 1/00503* (2013.01); *G06F 3/1236* (2013.01); *H04N 2201/0036* (2013.01); *H04N 2201/0075* (2013.01)

(56) References Cited

U.S. PATENT DOCUMENTS

2012/0260192 A1* 10/2012 Detweiler ................ 715/745
2013/0222837 A1* 8/2013 Watanabe ................. 358/1.14

OTHER PUBLICATIONS

Office Action issued on Feb. 12, 2014, by the Japanese Patent Office in corresponding Japanese Patent Application No. 2012-059582, and an English Translation of the Office Action. (7 pages).

* cited by examiner

INFORMATION PROCESSING DEVICE USING DIRECT DATA ACCESS FROM CLOUD STORAGE

This application is based on the application No. 2012-059582 filed in Japan, the contents of which are hereby incorporated by reference.

BACKGROUND OF THE INVENTION

1. Field of the Invention

The present invention relates to an information processing system, a communication terminal, an information processing device and a non-transitory computer readable recording medium. The present invention more specifically relates to a technique of operating the information processing device by remote control via the communication terminal.

2. Description of the Background Art

Conventional information processing devices called as MFPs (Multi-Function Peripherals) including print and/or scan function are generally used with network access and are allowed to transmit and receive a variety of data such as document data. By way of example, the information processing device may send image data generated by reading a document to a service provider when the information processing device such as one of MFPs and the service provider are allowed to establish communication therebetween, thereby registering the image data with the service provider. This known technique is introduced for example in Japanese Patent Application Laid-Open No. JP 2006-302145 A.

Especially in these days, several companies have launched cloud services providing a storage on which a variety of data such as document data can be stored over an internet. The information processing device is allowed to access a service providing server which provides the cloud service over the internet in response to user's instruction, and transmit and receive data to and from the service providing server.

In recent years, communication terminals such as tablet terminals or smart phones have become widely popular. This type of communication terminal includes a function allowing radio connection to a network such as LAN (Local Area Network) or WAN (Wide Area Network), or public phone lines. Thus, internet accessible environment gives the user access to the service providing server to use the cloud service any time, anywhere on the communication terminal. The communication terminals are expected to increase in popularity in the future, and in response to the increase in popularity, the cloud service may be used by the user on the communication terminal in an environment such as an office, for example.

In such an above-mentioned case, the user might upload image data generated by reading a document with scan function on the information processing device, or download data stored with the cloud service to the information processing device to produce a printed output while he or she is using the cloud service on the communication terminal. In this case, however, the user needs to make the information processing device access to the cloud service the same as that accessed by the user on the communication terminal by operating the information processing device.

The information processing device placed at a place such as the office, however is shared and used by multiple users. The information processing device generally does not store therein information including that as to the cloud service, which is used by an individual user. When the user operates the information processing device to make access to the cloud service, he or she is required to enter information such as an address or an account of the service providing server by manual, resulting in poor operability. This problem also arises in the known technique introduced for example in Japanese Patent Application Laid-Open No. JP 2006-302145 A.

The user may be allowed to make the information processing device log into the cloud service by operating the information processing device. Even in such a case, the user needs to find a folder to upload data, or a file to download by continuing the operation on the information processing device. If he or she had already made operation in advance to look for a folder to upload data, or a file to download on the communication terminal, he or she has to make the same operation again on the information processing device, resulting in poor operation efficiency.

Recently, a short distance radio communication such as NFC (Near Field Communication) between the communication terminal and the information processing device has become possible to make a display screen image displayed on an operational panel of the information processing device display with the communication terminal. In this case, the communication terminal serves as a remote operational panel to operate the information processing device by remote control. When, however, the communication terminal serves as the remote operational panel as connecting to the cloud service, two of the same display screens, the display screen image acquired by the information processing device, which is logged into the cloud service, and the display screen image acquired by itself after logging into the cloud service are displayed with the communication terminal. This confuses the user, who wonders the operation to specify the folder in response to which display screen image is right to upload the data from the information processing device to the cloud service, or to download the data stored with the cloud service to the information processing device and produce the printed output. This results in extremely poor operability.

SUMMARY OF THE INVENTION

The present invention is intended to solve the above problems. Thus, the present invention is intended to provide an information processing system, a communication terminal, an information processing device and a non-transitory computer readable recording medium capable of realizing enhanced operability of data communication between the information processing device and a service providing server, which provides a cloud service, and efficient data communication with allowing a user to make operation on the communication terminal.

First, the present invention is directed to an information processing system comprising a communication terminal and an information processing device that allow communication therebetween.

According to an aspect of the information processing system, the communication terminal includes: a display part on which a variety of information is displayed to a user; a remote controlling part for acquiring an operation screen image, with which the user makes remote operation of the information processing device, by establishing communication with the information processing device in response to user's instruction, and causing the acquired operation screen image to be displayed on the display part; and a cloud service connecting part for connecting to a service providing server providing a cloud service over a network, and acquiring a display screen image for using the cloud service from the service providing server in response to user's instruction, thereby causing the acquired display screen image to be displayed on the display part together with the operation screen image displayed by the remote controlling part. The remote controlling part of the communication terminal sends connecting information for connecting to the service providing server to the information processing device as the cloud service connecting part is connecting to the service providing server. The information processing device includes: a communicating part for connecting to the service providing server over the network, and establishing communication with the service providing server in accordance with the connecting information received from the communication terminal; and a screen image transmitting part for sending a display screen image acquired by the communicating part from the service providing server to the communication terminal, and the remote controlling part of the communication terminal switches the display screen image displayed by the cloud service connecting part on the display part to the display screen image acquired by the information processing device from the service providing server when receiving the display screen image acquired from the service providing server by the information processing device, and sends user's instruction given to the switched display screen image to the information processing device.

Second, the present invention is directed to a communication terminal capable of establishing communication with an information processing device to and from which data is transmitted and received.

According to one aspect of the communication terminal, the communication terminal, comprises: a display part on which a variety of information is displayed to a user; a remote controlling part for acquiring an operation screen image, with which the user makes remote operation of the information processing device, by establishing communication with the information processing device in response to user's instruction, and causing the acquired operation screen image to be displayed on the display part; and a cloud service connecting part for connecting to a service providing server providing a cloud service over a network, and acquiring a display screen image for using the cloud service from the service providing server in response to user's instruction, thereby causing the acquired display screen image to be displayed on the display part together with the operation screen image displayed by the remote controlling part. The remote controlling part, as the cloud service connecting part is connecting to the service providing server, sends connecting information for connecting to the service providing server to the information processing device to cause the information processing device to establish communication with the service providing server, thereby acquiring a display screen image for using the cloud service from the information processing device to switch the display screen image displayed by the cloud service connecting part on the display part to the display screen image acquired by the information processing device from the service providing server and sending user's instruction given to the switched display screen image to the information processing device.

Third, the present invention is directed to an information processing device capable of establishing communication with a communication terminal. The communication terminal is connected to a service providing server providing a cloud service.

According to one aspect of the information processing device, the information processing device, comprises: a communicating part for connecting to the service providing server over a network, and establishing communication with the service providing server in accordance with connecting information, the connecting information being received from the communication terminal as the communication terminal is connecting to the service providing server; a screen image transmitting part for creating an operation screen image for remote operation on the communication terminal and sending the operation screen image to the communication terminal, and for sending a display screen image acquired by the communicating part from the service providing server to the communication terminal by establishing communication with the communication terminal; and a job controlling part for directly transmitting and receiving data to and from the service providing server through the communicating part to execute a job without connecting via the communication terminal when an instruction on data transmission and receipt to and from the service providing server is received from the communication terminal as the communicating part is connecting to the service providing server.

Forth, the present invention is directed to a non-transitory computer readable recording medium on which a program is recorded. The program is executable on a communication terminal capable of connecting to a service providing server providing a cloud service by running an application. The program causes the communication terminal to establish communication with an information processing device, to and from which data is transmitted and received, thereby remotely controlling the information processing device.

According to an aspect of the non-transitory computer readable recording medium, the program executed on the communication terminal to function as a system comprises: a screen image controlling part for acquiring an operation screen image, with which a user makes remote operation of the information processing device, by establishing communication with the information processing device, and causing the acquired operation screen image to be displayed on a predetermined display part; a connection detecting part for detecting that the application is connecting to the service providing server; and a communication path switching part for sending connecting information for connecting to the service providing server to the information processing device, and causing the information processing device to establish communication with the service providing server as the application is connecting to the service providing server. The screen image controlling part, as the information processing device starts communication with the service providing server in response to sending the connecting information to the information processing device by the communication path switching part, acquires a display screen image for using the cloud service from the information processing device to switch a display screen image for using the cloud service, which is displayed on the display part by the application, to the display screen image acquired from the information processing device, and sends user's instruction given to the switched display screen image to the information processing device.

DESCRIPTION OF THE PRESENT PREFERRED EMBODIMENTS

Figure 1:
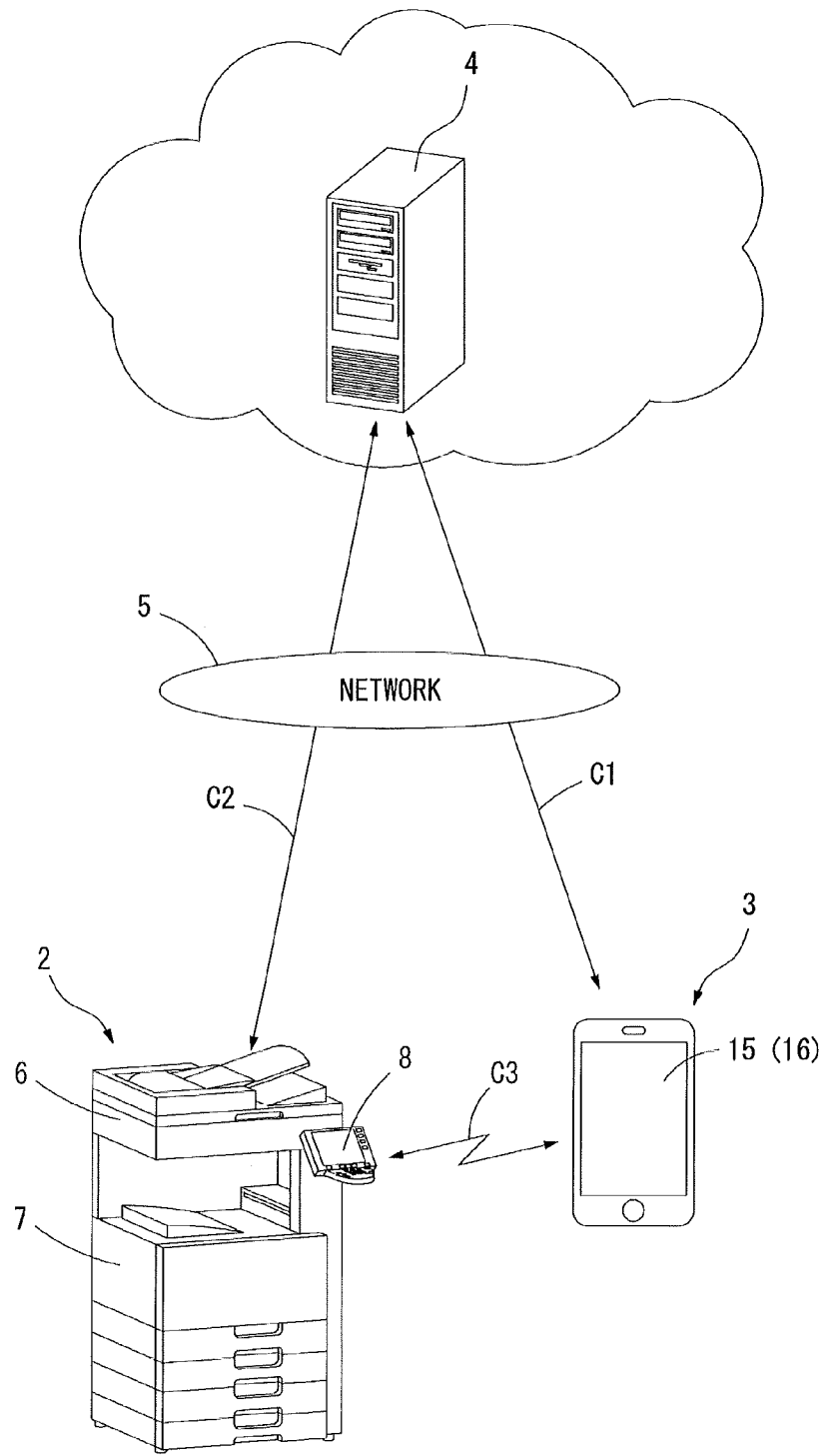
FIG. 1 shows an exemplary configuration of an information processing system.

A preferred embodiment of the present invention is described in detail below with reference to figures. In the description given below, those elements which are shared in common among figures are represented by the same reference numerals, and these elements are not discussed repeatedly for the same description.

FIG. 1 shows an exemplary configuration of an information processing system 1 of the present preferred embodiment. The information processing system 1 comprises an information processing device 2 formed from a device such as one of MFPs and a communication terminal 3 used by a user with usually carrying it with him or her. On the information processing system 1, each of the information processing device 2 and the communication terminal 3 is capable of accessing a service providing server 4 that provides a cloud service over a network 5. The network 5 includes LAN and/or WAN or public phone lines and/or internet networks.

The information processing device 2 having multiple functions including copy, scan, print and box function, for example, besides function to establish data communication over the network 5. Scan function is to drive a scanner section 6 provided at the upper part of the device body of the information processing device 2 to read image of a document and generate image data thereof. Print function is to drive a printer section 7 provided at the central part of the device body of the information processing device 2 to produce a printed output. Copy function is to activate scan and print function in series to copy an image of a document and produce a copied output. Box function is to store a variety of data in a storage region (box) described later. The image data generated with scan function or data received over the network 5, for example, is stored in the storage region. These scan, print and box functions may operate in relative to data communication function to establish data communication over the network 5. For scan function, for instance, the image data generated by reading the document may be sent to outside with data communication function. For print function, the printed output may be produced based on image data acquired from outside with data communication function. This type of information processing device 2 placed at a place such as an office is used by multiple users.

An operational panel 8, a user interface operable by a user in use of the information processing device 2 is provided at the front part of the device body of the information processing device 2. The information processing device 2 puts at least one of the above-mentioned multiple functions into operation to execute a job specified by the user in response to user's instruction given through the operational panel 8, for example.

The information processing device 2 includes a function to establish a short distance radio communication with a specific device placed within a range of a predetermined distance with NFC (Near Field Communication). The information processing device 2 including short distance radio communication function is capable of establishing communication one-to-one with the communication terminal 3 carried by the user who is trying to use the information processing device 2. A variety of data including the image data generated in response to scan function may be transmitted and received to and from the communication terminal 3.

The communication terminal 3 is a portable information terminal device formed from a device such as a tablet terminal or a smart phone. The communication terminal 3 is owned by an individual user. The communication terminal 3 includes two types of radio communication functions. One is to establish data communication with other devices over the network 5 and another is to establish short distance radio communication with a specific device placed in the range of the predetermined distance with NFC. A various types of application programs are allowed to be installed on the communication terminal 3. The application program to use the cloud service provided by the service providing server 4 may be installed in advance on the communication terminal 3. With running the installed application program, the user may use the cloud service provided by the service providing server 4 any time, anywhere he or she wants through the communication terminal 3.

The communication terminal 3 establishes short distance radio communication with the information processing device 2, thereby serving as a remote operational panel of the information processing device 2. As serving as the remote operational panel of the information processing device 2, the communication terminal 3 acquires a display screen image to be displayed on the operational panel 8 of the information processing device 2, and displays the acquired display screen image on a display unit 15. With receipt of the user's instruction in response to the displayed display screen image, the communication terminal 3 sends the instruction to the information processing device 2. Thus, the user is allowed to give an instruction to the information processing device 2 on the communication terminal 3 without directly operating the operational panel 8 of the information processing device 2.

The service providing server 4 is installed on the internet, for example, and provides a variety of cloud services over the internet. The service providing server 4 creates an account for each registered user, for example, and sets a predetermined dedicated data storage region for each account, available for each registered user. The service providing server 4 provides the service for the registered user to upload data to the respective data storage region over the network 5, or to download data in the respective data storage region. This type of service providing server 4 is generally installed on the internet and the number of which is not just one. The example of FIG. 1 shows only one of the service providing servers 4 generally installed on the internet.

On the information processing system 1 configured as described above, the user normally uses his or her communication terminal 3 to establish connection C1 with the cloud service provided by the service providing server 4, thereby using the cloud service. The user sometimes would like to upload the image data generated by reading the document on the information processing device 2 to the cloud service or to download the data stored with the cloud service to the information processing device 2 and produce the printed output based on the downloaded data. In such a case, the communication terminal 3 is caused to serve as the remote operational panel of the information processing device 2, and short distance radio communication C3 is caused to be established between the communication terminal 3 and the information processing device 2 by the user. In response to establishing short distance radio communication C3, the information processing device 2 is operated by remote control on the communication terminal 3 by the user.

There are two transmission paths that allow the information processing device 2 to establish data communication with the service providing server 4. The first path is to follow a path C2 over which the information processing device 2 establishes direct data communication with the service providing server 4. The second path is to follow paths C2 and C3 over which the information processing device 2 establishes data communication with the service providing server 4 via the communication terminal 3.

When uploading from the information processing device 2, or downloading to the information processing device 2, the communication terminal 3 determines either the first or second path realizes efficient data transmission. If the first path allows efficient data transmission, the communication terminal 3 controls the information processing device 2, thereby causing the information processing device 2 to establish connection C2 so that the information processing device 2 may establish direct data communication with the service providing server 4. The communication terminal 3 then sends an uploading instruction or a downloading instruction to the information processing device 2, and controls the information processing device 2 to establish direct data communication with the service providing server 4 over the network 5. The communication terminal 3 and the information processing device 2 operating in this manner are explained more in detail next.

Figure 2:
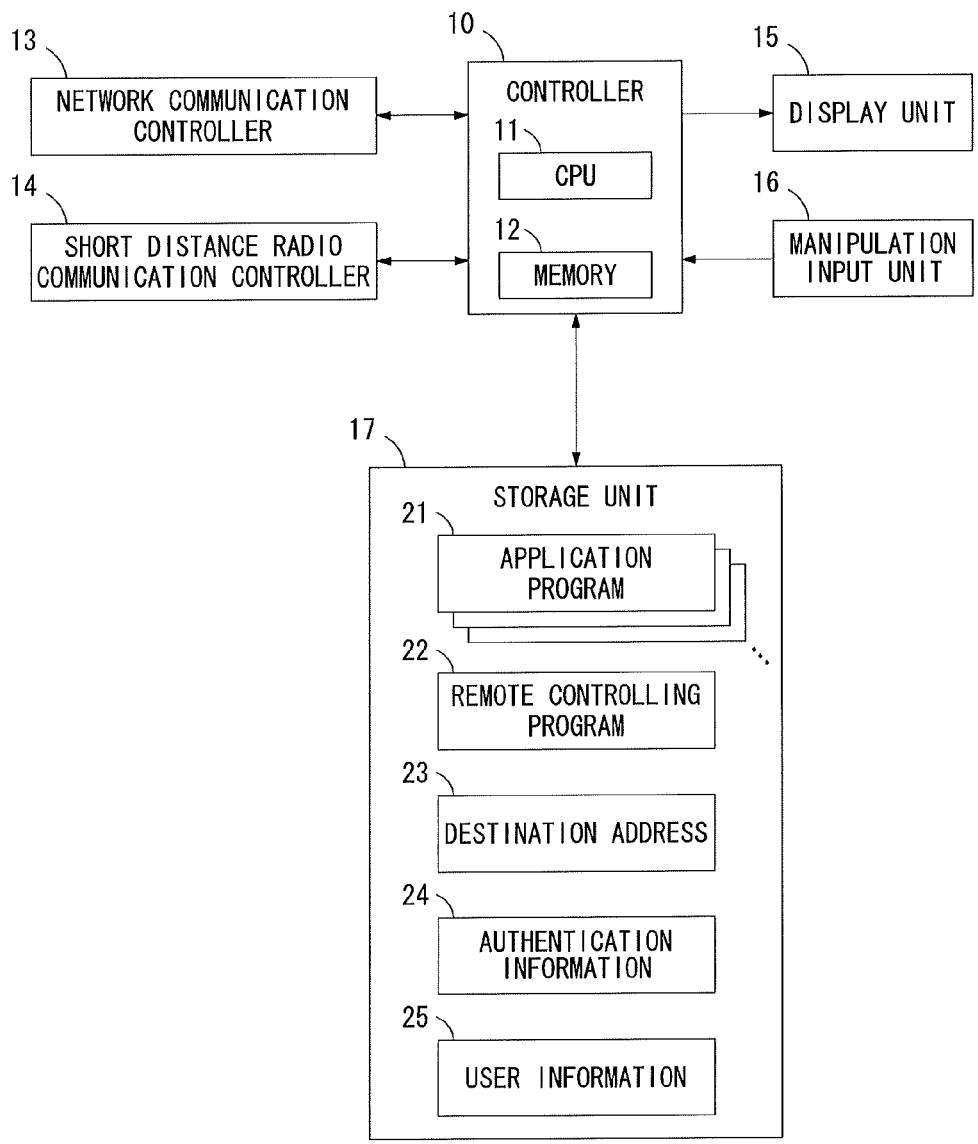
FIG. 2 is a block diagram showing an exemplary hardware configuration of a communication terminal.

The communication terminal 3 is described next. FIG. 2 is a block diagram showing an exemplary hardware configuration of the communication terminal 3. As illustrated in FIG. 2, the communication terminal 3 includes a controller 10, a network communication controller 13, a short distance radio communication controller 14, the display unit 15, a manipulation input unit 16 and a storage unit 17. The communication terminal 3 formed from the device such as the smart phone includes a microphone or a speaker besides the above-mentioned units to make a voice call.

The controller 10 including a CPU 11 and a memory 12 controls operations of each processing part. The CPU 11 executes various types of programs stored on the storage unit 17. The memory 12 stores therein data such as temporary data required in accordance with execution of each program by the CPU 11.

The network communication controller 13 controls data communication when the data communication is established over the network 5 by the controller 10. The short distance radio communication controller 14 controls short distance radio communication when the communication is established with the information processing device 2 by the controller 10. Once the short distance radio communication becomes available with the information processing device 2, for example, the short distance radio communication controller 14 automatically detects it and notifies the controller 10.

The display unit 15 on which various types of information is displayed to the user of the communication terminal 3 is formed from a device such as a color liquid crystal display, for example. The manipulation input unit 16 formed with parts such as touch panel sensors arranged on the screen of the display unit 15, for example, receives entries by the user of the communication terminal 3.

The storage unit 17 is formed from a nonvolatile storage device such as a solid state drive (SSD). The storage unit 17 stores therein as a program executed by the CPU 11 a plurality of application programs 21 used by the user and a remote controlling program 22 for operating the information processing device 2 by remote control.

The plurality of application programs 21 include a program for the communication terminal 3 to connect to the service providing server 4 and use the cloud service. When, for example, more than one cloud services is used by the user, the plurality of application programs 21 corresponding to each of the more than one cloud services are stored in the storage unit 17.

The storage unit 17 stores therein a variety of data and information besides the programs. As an example of the variety of data and information, a destination address 23, authentication information 24 and user information 25 are shown in FIG. 2. The destination address 23 is required for access to the service providing server 4 from the communication terminal 3. The destination address 23 is an address such as a URL (Uniform Resource Locator), for instance. The authentication information 24 is used when the communication terminal 3 logs into a user-specific account registered in advance with the service providing server 4. The authentication information 24 is information about a user ID or a password registered in advance with the service providing server 4. For the user using more than one cloud services, the authentication information 24 is stored for each cloud service. The user information 25 is information about the user of the communication terminal 3. The user information 25 is information required for the use of the information processing device 2, and is sent to the information processing device 2 when the communication terminal 3 starts operating the information processing device 2 by remote control. The communication terminal 3 sends the user information 25 to the information processing device 2, thereby making the information processing device 2 perform user authentication to authenticate if the user who performs remote operation is a registered user.

Figure 3:
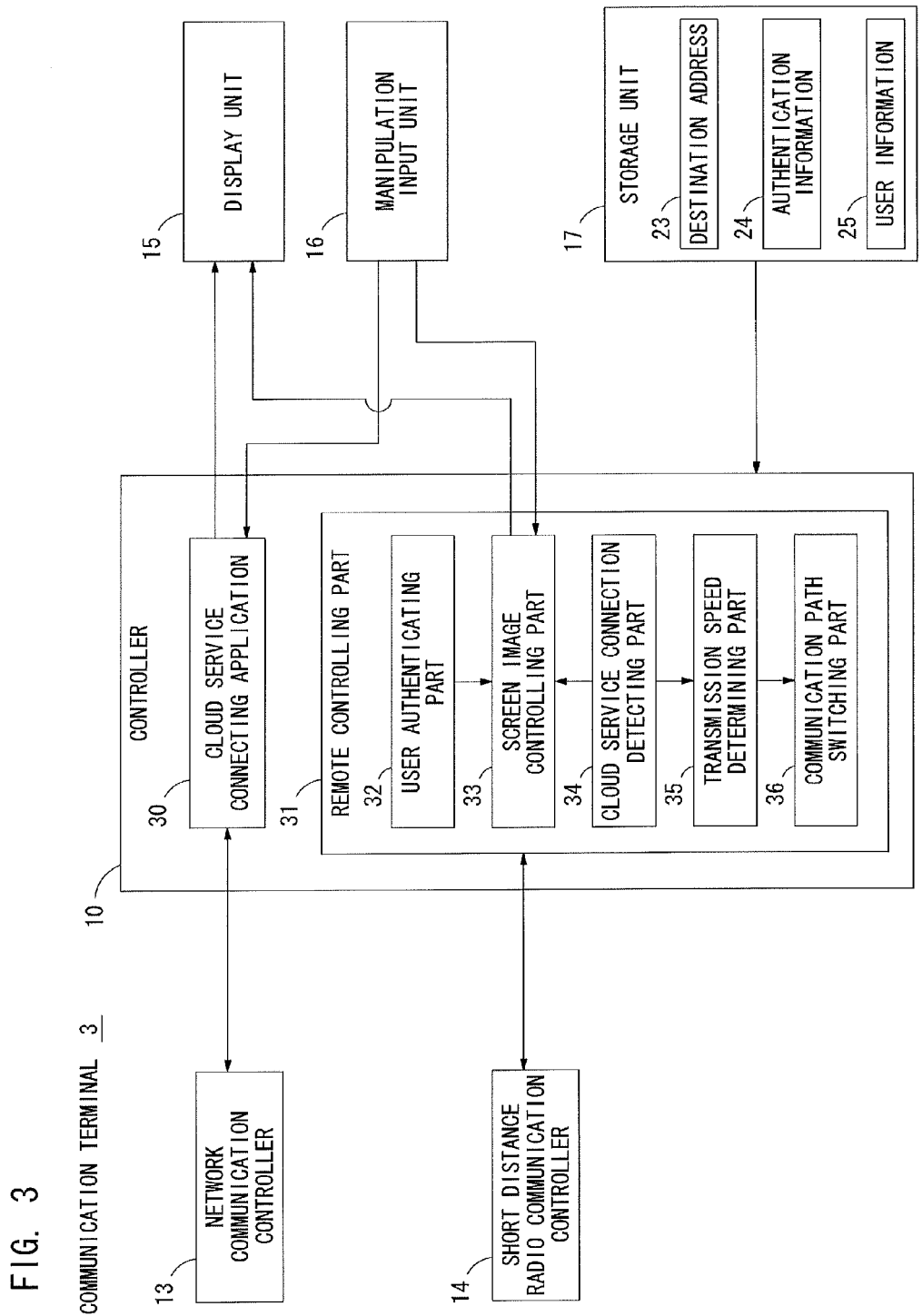
FIG. 3 is a block diagram showing an exemplary functional configuration of a controller realized when each of an application program and a remote controlling program is running on the communication terminal.

In response to the user's instruction, the above-described communication terminal 3 starts up each of the application program 21 and the remote controlling program 22. FIG. 3 is a block diagram showing an exemplary functional configuration of the controller 10 realized when each of the application program 21 and the remote controlling program 22 is running on the communication terminal 3. As shown in FIG. 3, in response to running the application program 21 on the communication terminal 3, the controller 10 serves as a cloud service connecting application 30. As the remote controlling program 22 runs on the communication terminal 3, the controller 10 serves as a remote controlling part 31. Each of the cloud service connecting application 30 and the remote controlling program 22 is capable of reading the destination address 23, the authentication information 24 and the user information 25 stored in the storage unit 17, respectively, as required.

After being in operation on the controller 10, the cloud service connecting application 30 reads the destination address 23 and accesses the service providing server 4 over the network 5 through the network communication controller 13. The cloud service connecting application 30 then reads the authentication information 24 in response to the request from the service providing server 4, and sends the read authentication information 24 to the service providing server 4. Thus, the cloud service connecting application 30 is allowed to automatically log into the user-specific account on the cloud service at its start up.

After automatically logging into the user-specific account, the cloud service connecting application 30 acquires a display screen image required for using the cloud service from the service providing server 4, and displays the acquired display screen image on the display unit 15. So, the cloud service connecting application 30 acquires the display screen image for using the cloud service from the service providing server 4 by following the communication path C1 shown in FIG. 1, and displays the acquired display screen image on the display unit 15. Also, the cloud service connecting application 30 receives user's instruction which is made in response to the display screen image from the manipulation input unit 16, and sends the operation information corresponding to the user's instruction to the service providing server 4. Thus, the display screen image displayed on the display unit 15 is updated almost immediately.

Figure 4:
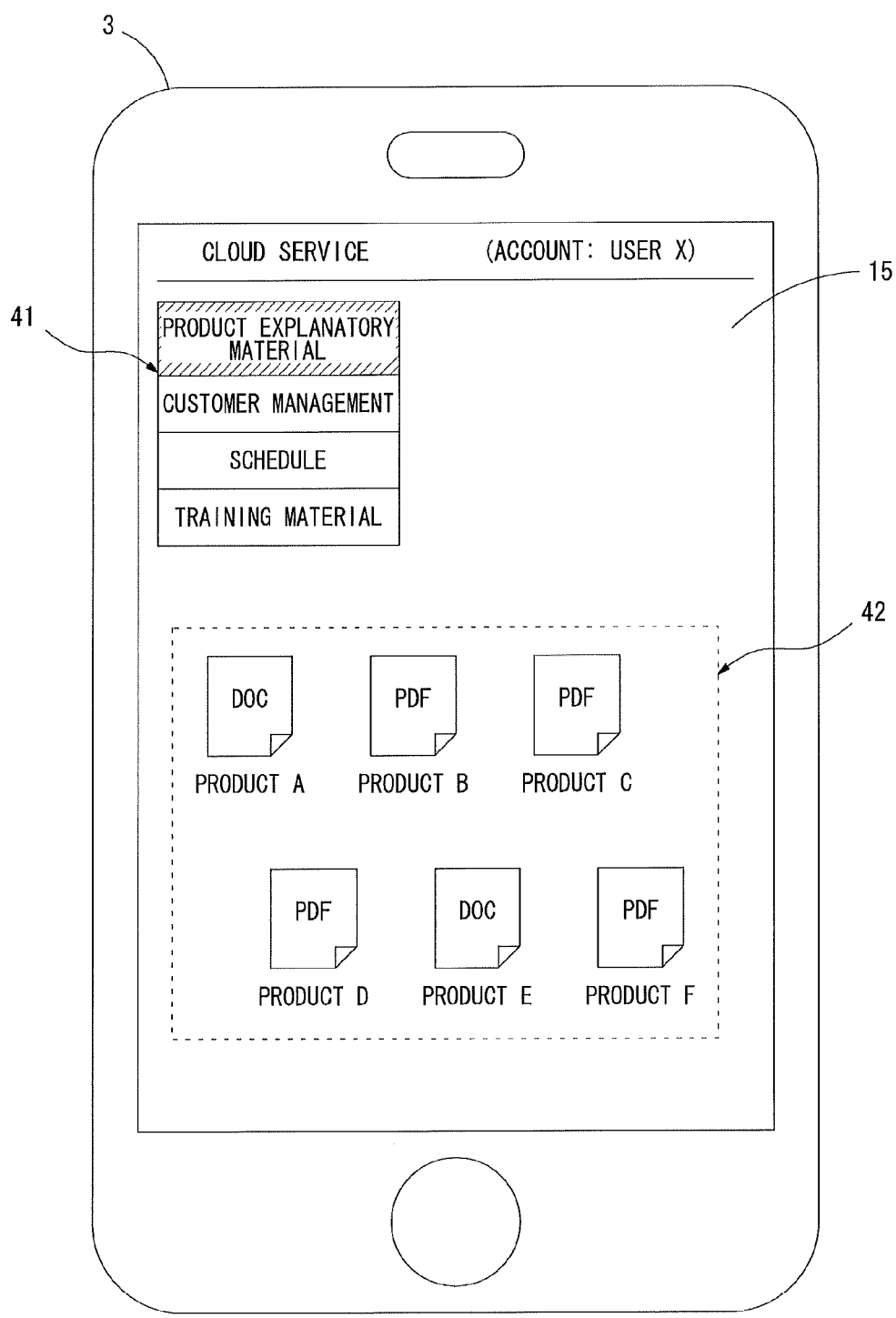
FIG. 4 is an example of a display screen image displayed on a display unit by a cloud service connecting application.

FIG. 4 is an example of the display screen image displayed on the display unit 15 in response to starting up of the cloud service connecting application 30 on the controller 10. As shown in FIG. 4, the display screen image displayed by the cloud service connecting application 30 on the display unit 15 by acquiring the image from the service providing server 4 includes a folder selecting field 41 and a file display field 42. The folder selecting field 41 shows multiple folders in which a variety of data is stored, and is pressed to select one of the folders. The file display field 42 shows a list of data files that are stored in the folder selected by pressing the folder selecting field 41. The user makes operation in response to such display screen image, and he or she is allowed to view the data stored with the cloud service, or to specify a folder to upload or a file to download.

Referring back to FIG. 3, after being in operation on the controller 10, the remote controlling part 31 establishes the short distance radio communication with the information processing device 2 through the short distance radio communication controller 14. With the short distance radio communication, the remote controlling part 31 acquires an operation screen image for remote operation from the information processing device 2 and displays the acquired operation screen image on the display unit 15, and sends the user's instruction in response to the displayed operation screen image to the information processing device 2. If the short distance radio communication with the information processing device 2 is not available at its start up, the remote controlling part 31 terminates and completes the start up process. If the short distance radio communication with the information processing device 2 is available, the remote controlling part 31 completes the start up process normally. After completing the start up process normally, the remote controlling part 31 serves as a user authenticating part 32, a screen image controlling part 33, a cloud service connection detecting part 34, a transmission speed determining part 35 and a communication path switching part 36.

The user authenticating part 32 is brought into operation in response to start up of the remote controlling part 31 to read the user information 25 in the storage unit 17 and send the read user information 25 to the information processing device 2. The information processing device 2 performs the authentication process to determine if the user is the registered user in accordance with the user information 25, and sends the authentication result to the communication terminal 3. After the user is authenticated as the registered user based on the authentication result, the user authenticating part 32 brings the screen image controlling part 33, the cloud service connection detecting part 34, the transmission speed determining part 35 and the communication path switching part 36 into operation.

The screen image controlling part 33 controls overall screen image displayed on the display unit 15 as the remote controlling part 31 is brought into operation on the communication terminal 3. To be more specific, the screen image controlling part 33 acquires the operation screen image for remote operation from the information processing device 2 and displays the acquired operation screen image on the display unit 15, and sends operation information based on the user's instruction in response to the displayed operation screen image to the information processing device 2.

Figure 5:
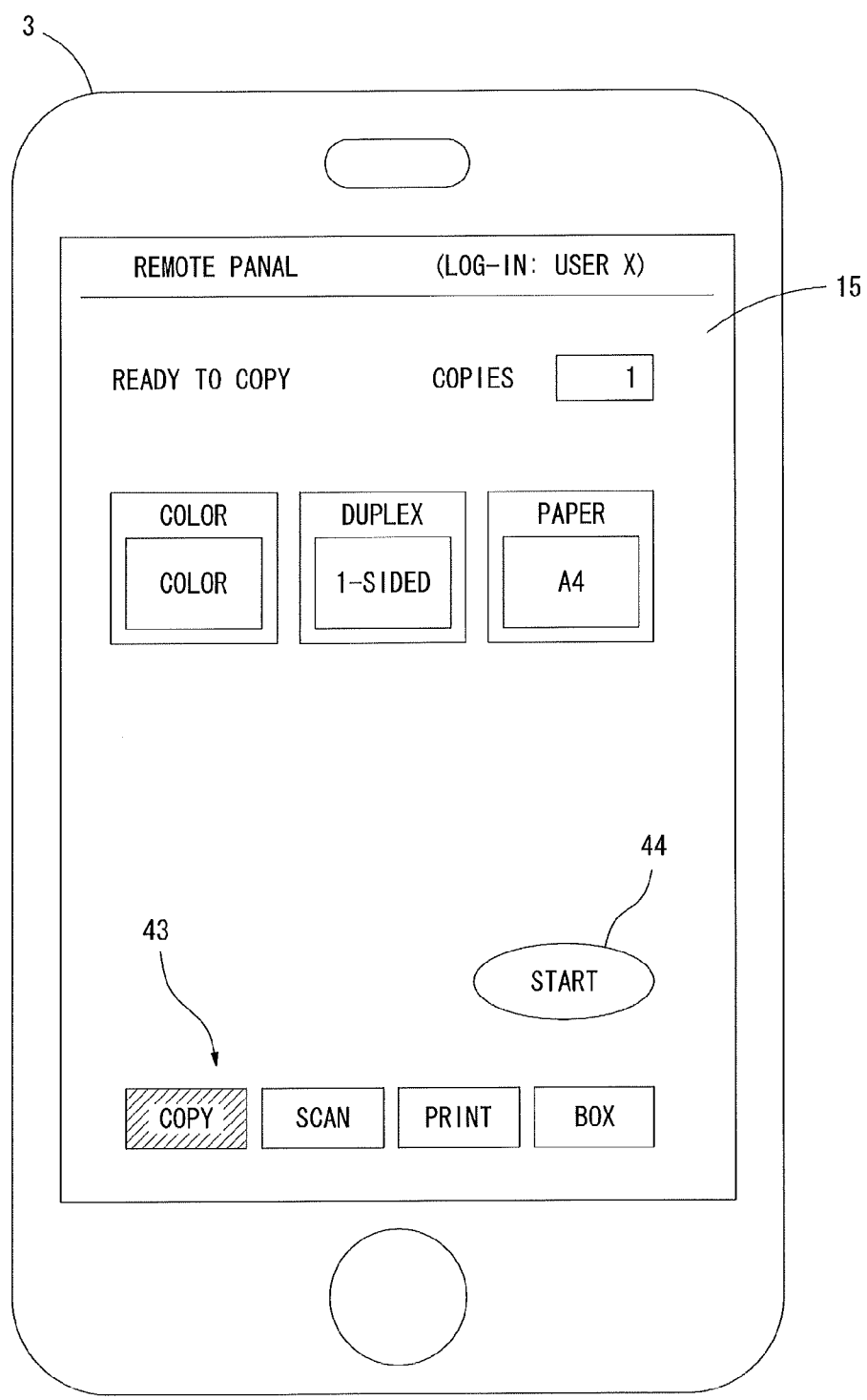
FIG. 5 is an example of a remote operation screen image displayed on the display unit by a screen image controlling part of a remote controlling part.

FIG. 5 is an example of the remote operation screen image displayed on the display unit 15 by the screen image controlling part 33. After acquiring the operation screen image from the information processing device 2, the screen image controlling part 33 displays the operation screen image corresponding to each function on the information processing device 2 on the display unit 15. A function selecting field 43 is shown in a bottom part of the operation screen image. The function selecting field 43 shows multiple functions including copy, scan, print and box functions, and is pressed to select a desired function. A start button 44 pressed to give an instruction to start job execution to the information processing device 2 is also shown in the operation screen image. By making operation in response to such remote operation screen image, the user is allowed to give instructions to the information processing device 2.

The cloud service connection detecting part 34 detects whether or not the aforementioned cloud service connecting application 30 is running and the communication terminal 3 is connecting to the cloud service over the network 5. If the cloud service connecting application 30 is not running as the remote controlling part 31 is brought into operation, the cloud service connection detecting part 34 monitors whether or not the cloud service connecting application 30 is to be started up. Upon the start up of the cloud service connecting application 30, the cloud service connection detecting part 34 detects the start up. The cloud service connection detecting part 34 then specifies the destination address 23 and the authentication 24 to be used by the cloud service connecting application 30. When the cloud service connecting application 30 has already been running as the remote controlling part 31 is brought into operation, the cloud service connection detecting part 34 detects that the cloud service connecting application 30 is running soon after it is brought into operation, and specifies the destination address 23 and the authentication 24 used by the cloud service connecting application 30.

After detecting that the cloud service connecting application 30 is connecting to the cloud service as described above, the cloud service connection detecting part 34 notifies the screen image controlling part 33 and the transmission speed determining part 35 of the detection result.

Figure 6:
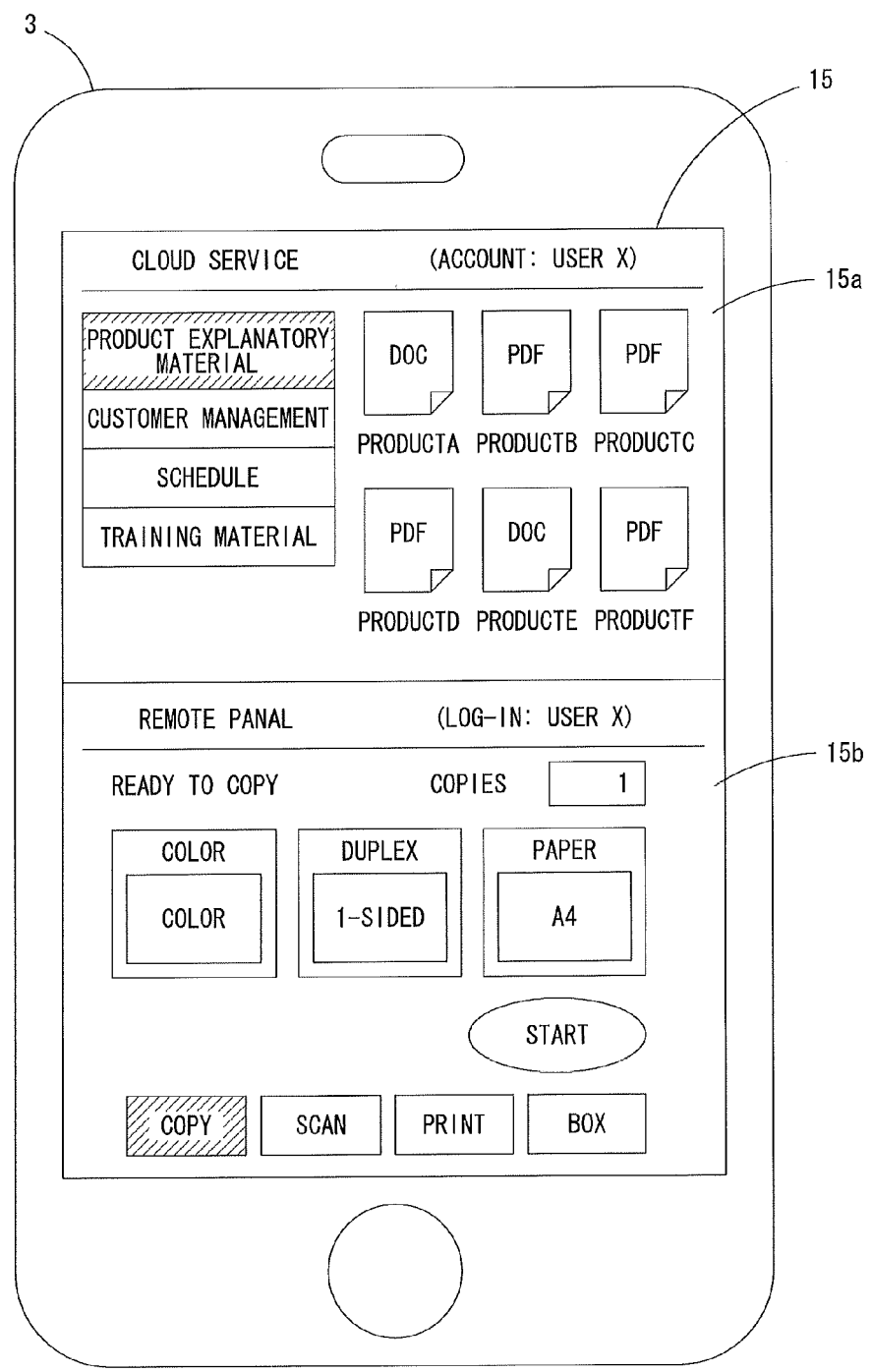
FIG. 6 is an example of split screen when the cloud service connecting application and the remote controlling part are brought into operation at the same time.

The screen image controlling part 33 detects that the cloud service connecting application 30 is connecting to the cloud service. In such a case, the screen image controlling part 33 splits and displays the screen image to be displayed on the display unit 15, for example. FIG. 6 is an example of split screen when the cloud service connecting application 30 and the remote controlling part 31 are brought into operation at the same time. The screen image controlling part 33 splits the screen of the display unit 15 as illustrated in FIG. 6, for instance, and displays a display screen image 15a required for using the cloud service and an operation screen image 15b required for remote operation of the information processing device 2 in parallel when the cloud service connecting application 30 and the remote controlling part 31 are brought into operation at the same time. With this split screen, the user is allowed to make operations in response to the display screen image 15a for using the cloud service and the operation screen image 15b for remote operation of the information processing device 2 at the same time.

In response to detecting connection to the cloud service by the cloud service connecting application 30, the transmission speed determining part 35 determines which of transmission paths, the aforementioned first path or the second path, realizes more efficient data transmission between the information processing device 2 and the cloud service.

Figure 7:
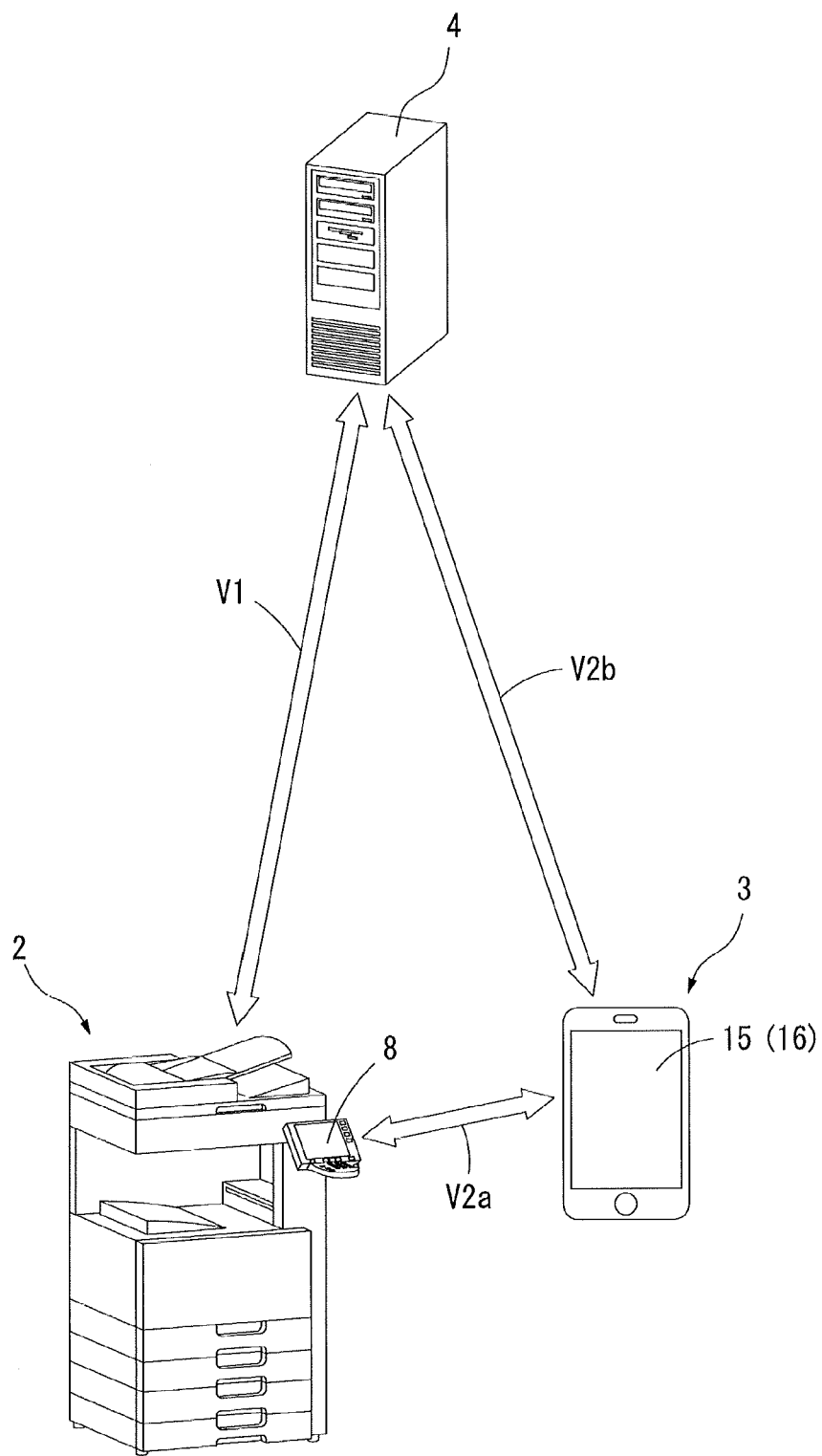
FIG. 7 shows a concept of transmission speed in each path between an information processing device and a service providing server.

In order to determine efficiency, the transmission speed determining part 35 calculates each transmission speed of data transmission by the first path and the second path. FIG. 7 shows a concept of the transmission speed in each path. It is assumed that data transmission speed V1 is a rate calculated in data transmission through the first path. So, the transmission speed V1 is a rate calculated in direct data transmission between the information processing device 2 and the service providing server 4 through a path C2 (see FIG. 1). It is also assumed that data transmission speed V2 is a rate calculated in data transmission through the second path. So, the transmission speed V2 is a rate calculated in data transmission between the information processing device 2 and the service providing server 4 via the communication terminal 3 through paths C1 and C3. The transmission speed V2 shall be obtained by calculating the transmission speed V2a in the path C3 and the transmission speed V2b in the path C1 as shown in FIG. 7.

The transmission speed determining part 35 calculates the transmission speed V2a in the path C3 between the information processing device 2 and the communication terminal 3 by sending a response command such as a ping command, for instance, then receiving the response to the response command from the information processing device 2. Similarly, the transmission speed determining part 35 calculates the transmission speed V2b in the path C1 between the service providing server 4 and the communication terminal 3 by sending the response command to the service providing server 4, to which the cloud service connecting application 30 is connecting, then receiving the response to the response command from the service providing server 4. The transmission speed determining part 35 obtains a value of the transmission speed V2 in the second path with the calculated values of the transmission speed V2a and V2b.

The transmission speed determining part 35 sends a calculating instruction to calculate the transmission speed V1 to the information processing device 2. In response to receiving the calculating instruction, the information processing device 2 calculates the transmission speed V1 in the path C2 between the service providing server 4 and itself by sending the response command such as the ping command, for example, to the service providing server 4, then receiving the response to the response command from the service providing server 4. The information processing device 2 then sends the obtained value of the transmission speed V1 to the communication terminal 3. The transmission speed determining part 35 thereby obtains the value of the transmission speed V1.

As described above, the transmission speed determining part 35 obtains the values of the transmission speed V1 in the first path and the transmission speed V2 in the second path. With the values of the transmission speed V1 and the transmission speed V2, the transmission speed determining part 35 compares the values and determines which transmission path, the first or the second path, realizes data transmission at a higher rate. It may be determined that more efficient data transmission is realized at a rate of the transmission speed V2 in the second path. In this case, connection over the transmission path through the second path has already been established. So, the process by the transmission speed determining part 35 is complete. It may be determined that more efficient data transmission is realized at a rate of the transmission speed V1 in the first path. In this case, connection over the transmission path through the first path is established yet. The transmission speed determining part 35 then brings the transmission path switching part 36 into operation.

The transmission path switching part 36 causes the information processing device 2 to establish connection through the first path by which direct communication with the service providing server 4 is allowed. The transmission path switching part 36 generates connecting information for access to the service providing server 4 to which the cloud service connecting application 30 is connecting. More specifically, the transmission path switching part 36 reads the destination address 23 and the authentication information 24 in the storage unit 17, which are used when the cloud service connecting application 30 accesses the service providing server 4, and generates the connecting information containing the read destination address 23 and authentication information 24. The transmission path switching part 36 then sends the generated connecting information for using the cloud service to the information processing device 2. Thus, the information processing device 2 is allowed to connect to the service providing server 4 with the connecting information received from the transmission path switching part 36 and to automatically log into a user-specific account of the cloud service provided by the service providing server 4.

When sending the generated connecting information to the information processing device 2, the transmission path switching part 36 detects access state as of then which is instructed by the user to the cloud service connecting application 30, and sends the connecting information containing the detected access state. So, the information processing device 2 is allowed to replicate the state the same as the usage state of the cloud service by the cloud service connecting application 30 based on the access state information after automatically logging into the user-specific account of the cloud service. To be more specific, the user may make operations to the cloud service connecting application 30, thereby specifying a folder to upload or a file to download. In this case, the information processing device 2 is allowed to provide the cloud service with specifying the same folder or file after automatically logging into the user-specific account of the cloud service.

The remote controlling part 31 causes the information processing device 2 to directly access the service providing server 4 through the first path as described above. The remote controlling part 31 then obtains the display screen image for using the cloud service via the information processing device 2. In this case also, the screen image controlling part 33 is brought into operation on the remote controlling part 31 to perform process in response to the obtained display screen image.

After obtaining the display screen image which is acquired by the information processing device 2 from the service providing server 4, the screen image controlling part 33 switches the display screen image displayed by the cloud service connecting application 30 on the display unit 15 to the display screen image acquired by the information processing device 2 from the service providing server 4.

Figure 8:
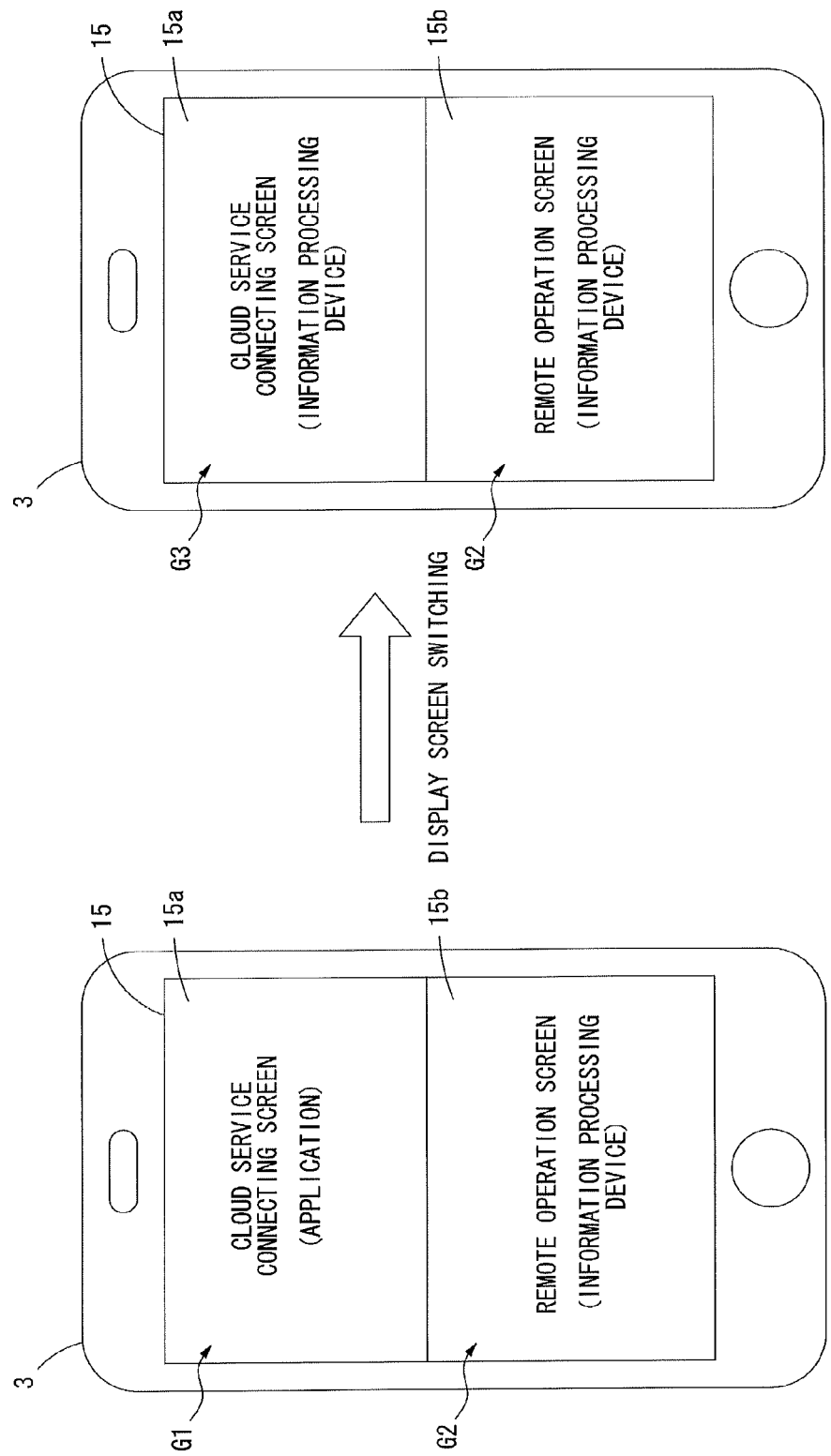
FIG. 8 shows a concept of display screen switching.

FIG. 8 shows a concept of display screen switching. As illustrated in FIG. 8, a display screen image G1 which is acquired by the cloud service connecting application 30 from the service providing server 4 is displayed on the display unit 15 as the display screen image 15a for using the cloud service before the display screen switching. As the operation screen image 15b for remote operation of the information processing device 2, an operation screen image G2 obtained from the information processing device 2 is displayed.

In response to obtaining the display screen image which is acquired by the information processing device 2 from the service providing server 4, the screen image controlling part 33 switches the display screen image as shown in FIG. 8. With this display screen switching, a display screen image G3 which is acquired by the information processing device 2 from the service providing server 4 is displayed as the display screen image 15a for using the cloud service. The same operation screen image G2 obtained from the information processing device 2 is kept being displayed as the operation screen image 15b for remote operation of the information processing device 2 before and after the display screen switching. The display screen image G3 displayed by the display screen switching shows the same display screen as the current display screen image G1. In order to notify the user of the switching of the display screen image 15a for using the cloud service, an image indicating that the screen image being displayed is the one acquired by the information processing device 2 from the service providing server 4 may be attached to the margins of the display screen image G3, for example, and displayed.

Figure 9:
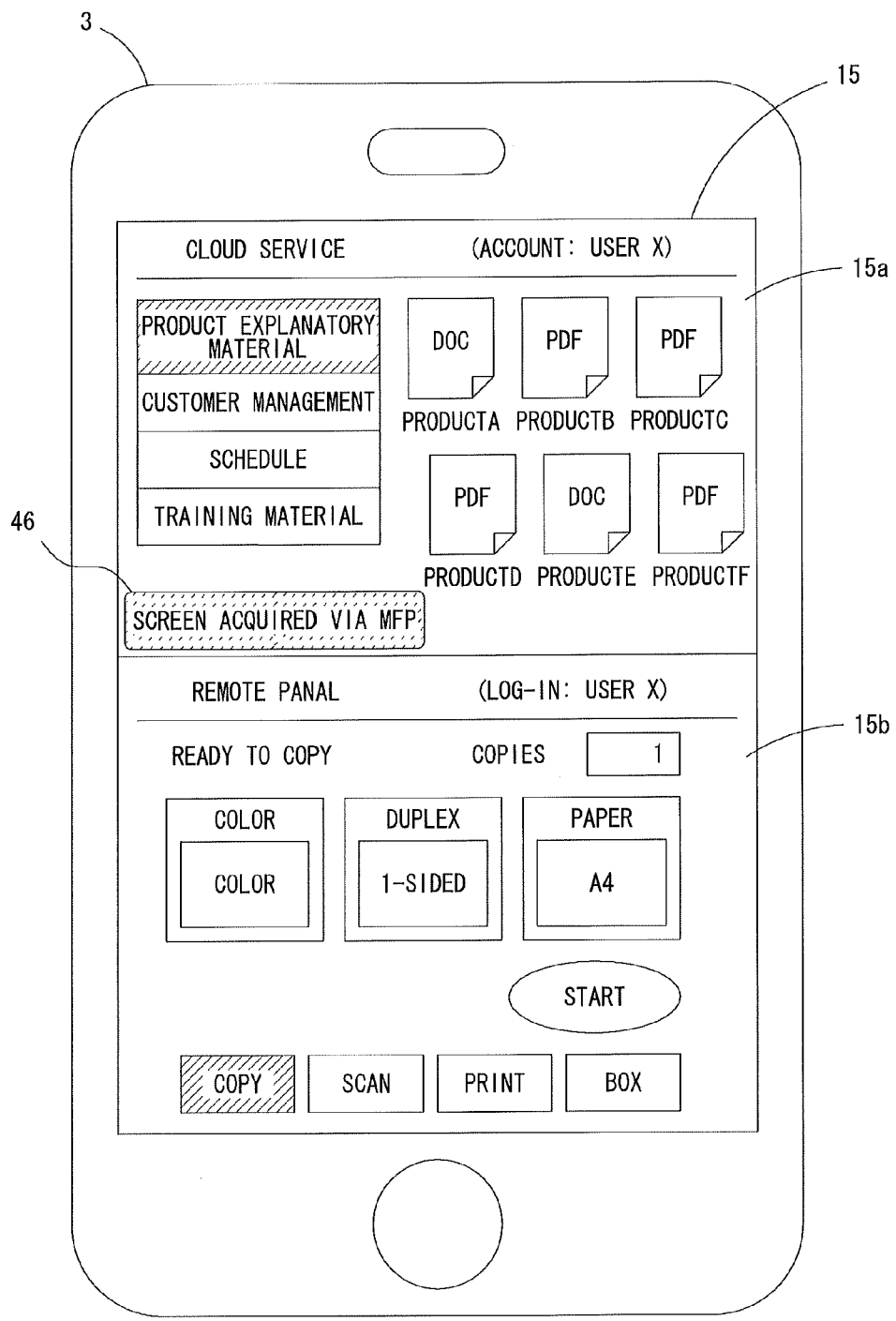
FIG. 9 is an example of split screen display after the screen switching by the screen image controlling part of the remote controlling part.

FIG. 9 is an example of split screen display after the screen switching by the screen image controlling part 33. As illustrated in FIG. 9, the split screen display after the screen switching shows almost the same display screen before the screen switching (for instance, the display screen of FIG. 6). In the example of the display screen of FIG. 9, an image 46 indicating that the screen image being displayed is the one acquired by the information processing device 2 from the service providing server 4 is attached to the margins of the display screen image 15a for using of the cloud service. The user is allowed to see the display screen image 15a is acquired through either path by checking the presence of the image 46. Further, the access state to the cloud service in response to the display screen image 15a is maintained before and after the screen switching. The user, therefore, does not have to care of the screen switching, and he or she is allowed to continue the operation from the state before screen switching.

Figure 10:
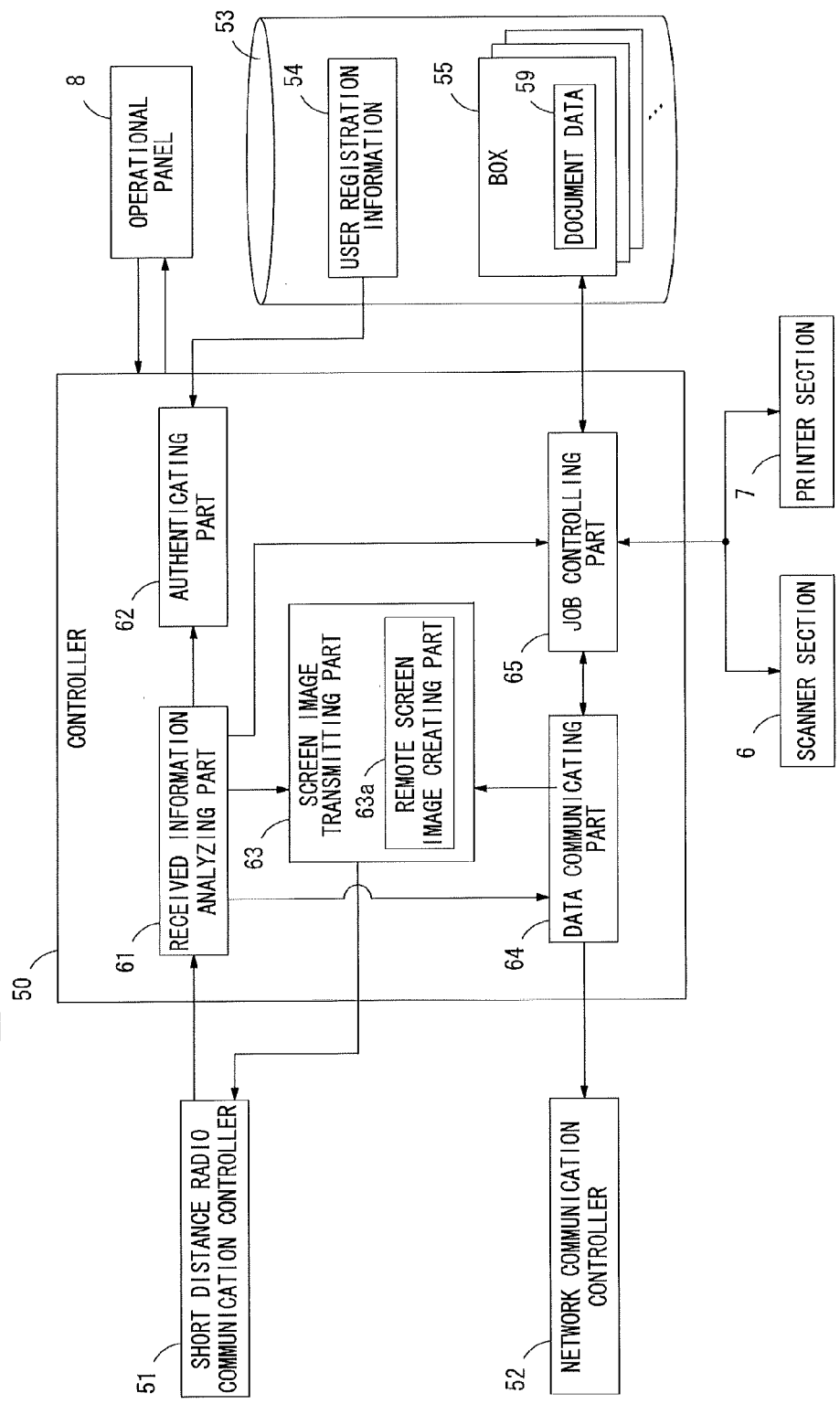
FIG. 10 is a block diagram showing an exemplary hardware configuration of the information processing device.

The information processing device 2 is explained next. FIG. 10 is a block diagram showing an exemplary hardware configuration of the information processing device 2. The information processing device 2 includes a controller 50, a short distance radio communication controller 51, a network communication controller 52 and a storage device 53 as shown in FIG. 10 besides the aforementioned scanner section 6, the printer section 7 and the operational panel 8.

The controller 50 includes a CPU and a memory not shown in FIG. 10, which is the same as the communication terminal 3. The CPU executes a predetermined program so that the controller 50 serves as a received information analyzing part 61, an authenticating part 62, a screen image transmitting part 63, a data communicating part 64 and a job controlling part 65.

The short distance radio communication controller 51 controls short distance radio communication when the communication is established with the communication terminal 3 by the controller 50. Once the short distance radio communication becomes available with the communication terminal 3, the short distance radio communication controller 51 automatically detects it and notifies the controller 50. The network communication controller 52 controls data communication when the data communication is established over the network 5 by the controller 50. When connecting to the service providing server 4 over the network 5, the information processing device 2 transmits and receives data to and from through the network communication controller 52.

The storage device 53 is formed from a nonvolatile storage device such as a hard disk drive (HDD). The storage device 53 stores therein user registration information 54, which is information registered as to the user who is authorized to use the information processing device 2 in advance, for example. The information that may identify the user such as user ID or a password, for instance, is registered as the user registration information 54. The user registration information 54 is not necessarily stored in the storage device 53. The user registration information 54 may be stored in another device such as another server. The storage device 53 includes at least one box 55 as a storage region to store therein data such as document data 59. The box 55 is the storage region to store therein a variety of data when the user selects box function.

Each processing part put into operation to function on the controller 50 is described next. The received information analyzing part 61 receives information from the communication terminal 3 through the short distance radio communication controller 51, and analyzes the received information. If the received information is a connecting request for remote operation, the received information analyzing part 61 extracts the user information 25 contained in the connecting request, and outputs the extracted user information 25 to the authenticating part 62.

The authenticating part 62 performs authentication process in accordance with the user information 25 received from the received information analyzing part 61. To be more specific, the authenticating part 62 reads the user registration information 54 in the storage device 53 and determines whether or not any information registered as the user registration information 54 matches the user information 25. If the information registered as the user registration information 54 matching the user information 25 is stored, the authentication results in success. As a result, the user using the communication terminal 3 is identified as the registered user. The authenticating part 62 then puts the information processing device 2 into a logged-in state to allow the registered user to use the information processing device 2 by remote control. After the information processing device 2 is put into the logged-in state, each of the screen image transmitting part 63, the data communicating part 64 and the job controlling part 65 is brought into operation.

After the information processing device 2 is put into the logged-in state, the screen image transmitting part 63 creates the operation screen image for remote operation on the communication terminal 3, and sends the created operation screen image to the communication terminal 3 through the short distance radio communication controller 51, in response to the connecting request received by the received information analyzing part 61. The screen image transmitting part 63 includes a remote screen image creating part 63a. The remote screen image creating part 63a creates the operation screen image for remotely operating the information processing device 2 on the communication terminal 3. As the received information analyzing part 61 receives the operation information in response to the operation screen image from the communication terminal 3, the remote screen image creating part 63a updates properly the operation screen image for remote operation based on the received operation information. The screen image transmitting part 63 sends the operation screen image, which is updated properly by the remote screen image creating part 63a, to the communication terminal 3 every time it is update.

When the data communicating part 64 accesses the service providing server 4 and acquires the display screen image for using the cloud service, the screen image transmitting part 63 sends the acquired display screen image to the communication terminal 3 through the short distance radio communication controller 51. The screen image transmitting part 63 may attach the image 46 indicating that the screen image is acquired by the information processing device 2 from the service providing server 4 to the margins of the display screen image acquired by the data communicating part 64 from the service providing server 4.

In response to receiving the calculating instruction of the transmission speed V1 of data transmission to and from the service providing server 4 from the communication terminal 3, the received information analyzing part 61 causes the data communicating part 64 to calculate the transmission speed. More specifically, the data communicating part 64 sends the response command such as the ping command, for instance, to an IP address of the service providing server 4, which is contained in the calculating instruction from the communication terminal 3, then receiving the response from the service providing server 4, thereby calculating the transmission speed V1, which is a rate of direct data communication with the service providing server 4. The data communicating part 64 sends the value of the transmission speed V1 thereby obtained to the communication terminal 3.

After receiving the connecting information for access to the service providing server 4 from the communication terminal 3, the received information analyzing part 61 outputs the received connecting information to the data communicating part 64. The communicating part 64 connects to the service providing server 4 through the network communication controller 52 based on the connecting information. The connecting information received from the communication terminal 3 contains the destination address 23 and the authentication information 24 for log-in to the user-specific account of the cloud service as described above. The communicating part 64 directly connects to the service providing server 4 over the network 5 in accordance with the destination address 23, and automatically logs into the cloud service with the authentication information 24 so that the cloud service becomes available.

As automatically logging into the service providing server 4, the communicating part 64 acquires the display screen image for using the cloud service from the service providing server 4. The communicating part 64 then outputs the acquired display screen image for using the cloud service to the screen image transmitting part 63. As already explained above, the screen image transmitting part 63 sends the display screen image acquired from the service providing server 4 to the communication terminal 3.

In response to receiving the operation information from the communication terminal 3, the received information analyzing part 61 determines whether the operation information corresponds to the operation in response to which screen image, the operation screen image for remote operation or the display screen image for using the cloud service. If the operation is in response to the operation screen image, the received information analyzing part 61 outputs the operation information to the screen image transmitting part 63 to make the operation screen image displayed with the communication terminal 3 update based on the operation information. When the operation is in response to the operation screen image and is to give a job execution instruction, the received information analyzing part 61 instructs the job controlling part 65 to start job execution. If the operation is in response to the display screen image acquired by the communicating part 64, the received information analyzing part 61 outputs the operation information to the communicating part 64. Thus, the communicating part 64 sends the operation information to the service providing server 4, and acquires the display screen image updated based on the operation information.

The job controlling part 65 is brought into operation when the operation information giving the job execution instruction is received. The job controlling part 65 controls execution of the job specified by the user of the communication terminal 3. The job controlling part 65 drives the scanner section 6 to read the document and generate the image data thereof, or the printer section 7 to produce the printed output by outputting the image data to the printer section 7. Also, the job controlling part 65 stores data such as the document data 59 in the box 55, or reads the document data 59 in the box 55. The job controlling part 65 gives a data transmission and receipt instruction to the communicating part 64, thereby controlling direct data transmission and receipt to and from the service providing server 4. The job controlling part 65, for example, directly uploads data such as the image data generated by reading the document with scan function or the document data 59 stored in the box 55 to the service providing server 4 through the communicating part 64. Moreover, the job controlling part 65 directly downloads the data stored in the service providing server 4 from the service providing server 4, and outputs the downloaded data to the printer section 7 to make the printer section 7 produce the printed output, or stores the downloaded data in the box 55.

As both the operation screen image for remote operation and the display screen image acquired by the communicating part 64 from the service providing server 4 have been sent to the communication terminal 3, the screen image transmitting part 63 is allowed to get information about the operation state of the user in response to each screen image. The screen image transmitting part 63 properly determines the operation state in response to each of the two screen images. So, when data upload or download becomes available, the screen image transmitting part 63 attaches an operation button to start data upload or download to the operation screen image for remote operation. As a result, such operation button is shown on the display unit 15 of the communication terminal 3.

Figure 11:
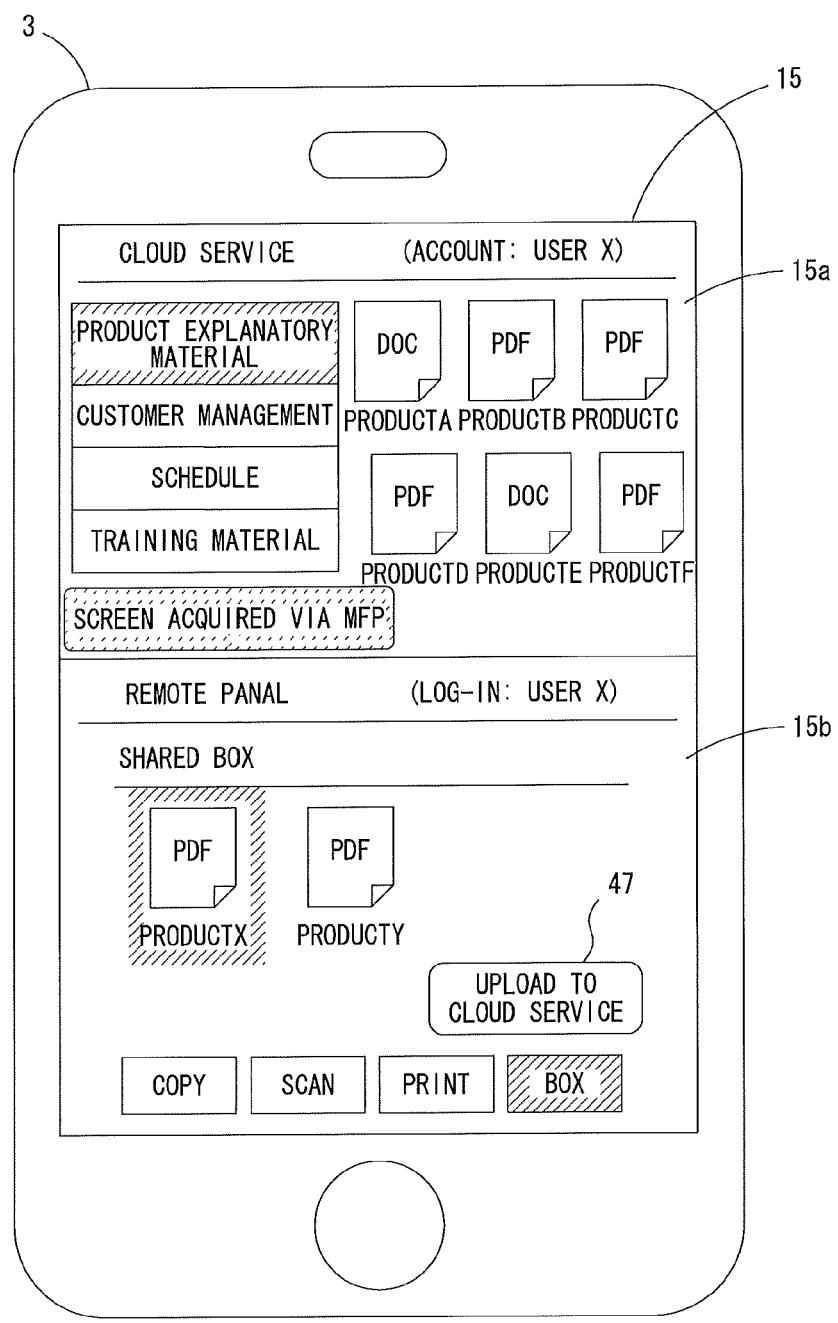
FIG. 11 is an example of screen image displayed on the display unit of the communication terminal as upload to a cloud service becomes available.

FIG. 11 is an example of the screen image displayed on the display unit 15 of the communication terminal 3 as upload to the cloud service becomes available. In the example of the screen image of FIG. 11, one of the folders is selected by the user on the display screen image 15*a* for using the cloud service. Box function is selected and one of the files stored in the box 55 is selected by the user on the operation screen image 15*b* for remotely operating the information processing device 2. With this operation state, the screen image transmitting part 63 determines that it enables the file selected by the user to upload to the folder on the cloud service. The screen image transmitting part 63 then attaches an operation button 47 to start data upload to the operation screen image 15*b*, and sends the operation screen image 15*b*. The operation button 47 is allowed to be shown on the display unit 15 of the communication terminal 3 as illustrated in FIG. 11. As a result, the user presses the operation button 47 with his or her fingertips, thereby easily giving an instruction to start uploading the data. In the example of FIG. 11, box function is selected. The operation button 47 starting data upload may be attached also in another case where scan function is selected.

Figure 12:
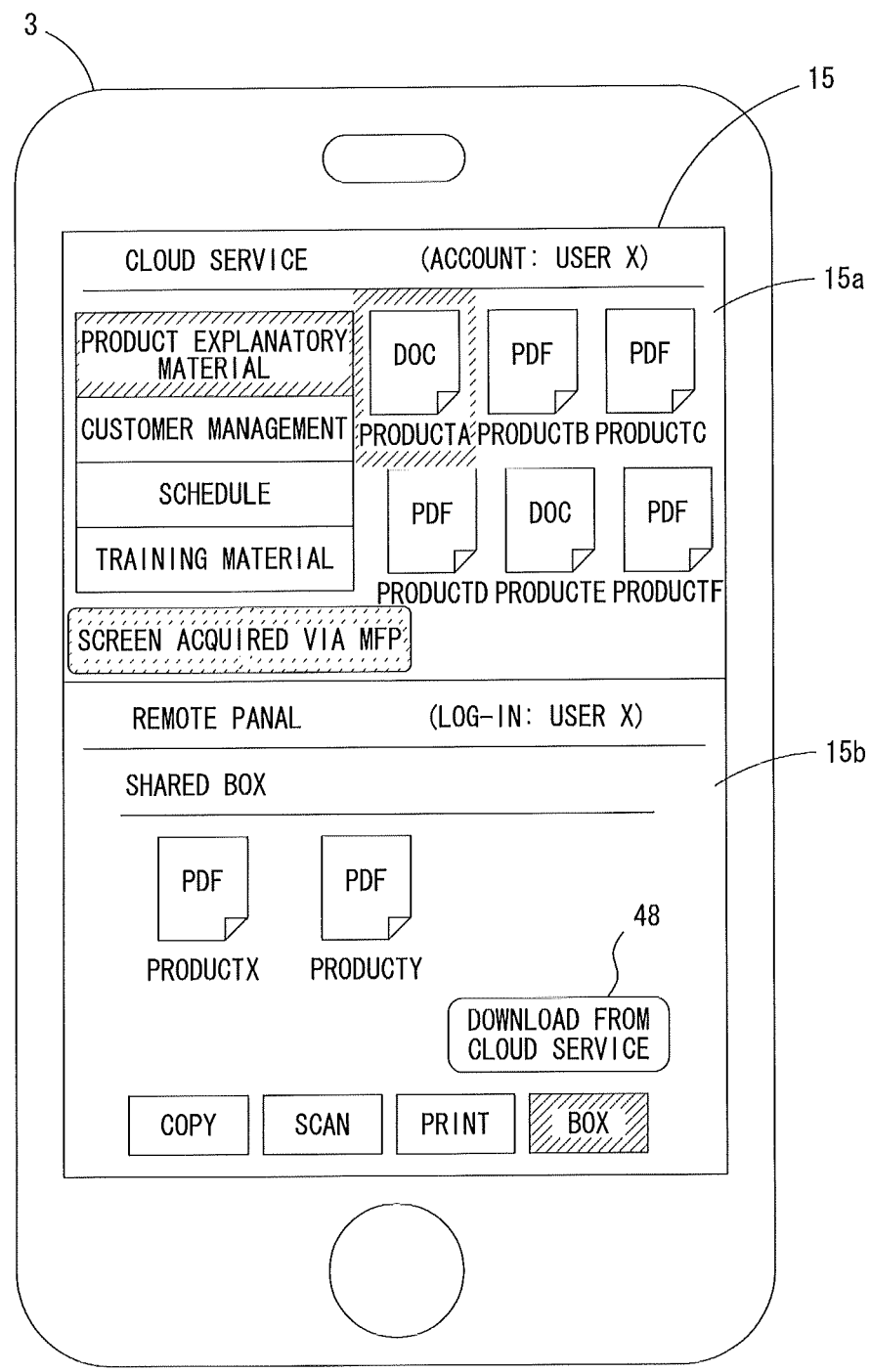
FIG. 12 is an example of screen image displayed on the display unit of the communication terminal as download from the cloud service becomes available.

FIG. 12 is an example of the screen image displayed on the display unit 15 of the communication terminal 3 as download from the cloud service becomes available. In the example of the screen image of FIG. 12, one of the files stored in one of the folders is selected by the user on the display screen image 15*a* for using the cloud service. Box function is selected and one of the boxes is selected by the user on the operation screen image 15*b* for remotely operating the information processing device 2. With this operation state, the screen image transmitting part 63 determines that it enables the file selected by the user among from the multiple files stored with the cloud service to download to the box of the information processing device 2. The screen image transmitting part 63 then attaches an operation button 48 to start data download to the operation screen image 15*b*, and sends the operation screen image 15*b*. The operation button 48 is allowed to be shown on the display unit 15 of the communication terminal 3 as illustrated in FIG. 12. As a result, the user presses the operation button 48 with his or her fingertips, thereby easily giving an instruction to start downloading the data. In the example of FIG. 12, box function is selected. The operation button 48 starting data download may be attached also in another case where print function is selected.

The process performed by the communication terminal 3 and the information processing device 2 in cooperation with each other is explained next. FIGS. 13 to 17 are exemplary sequential procedures of the process performed by the communication terminal 3 and the information processing device 2 in cooperation with each other.

Figure 13:
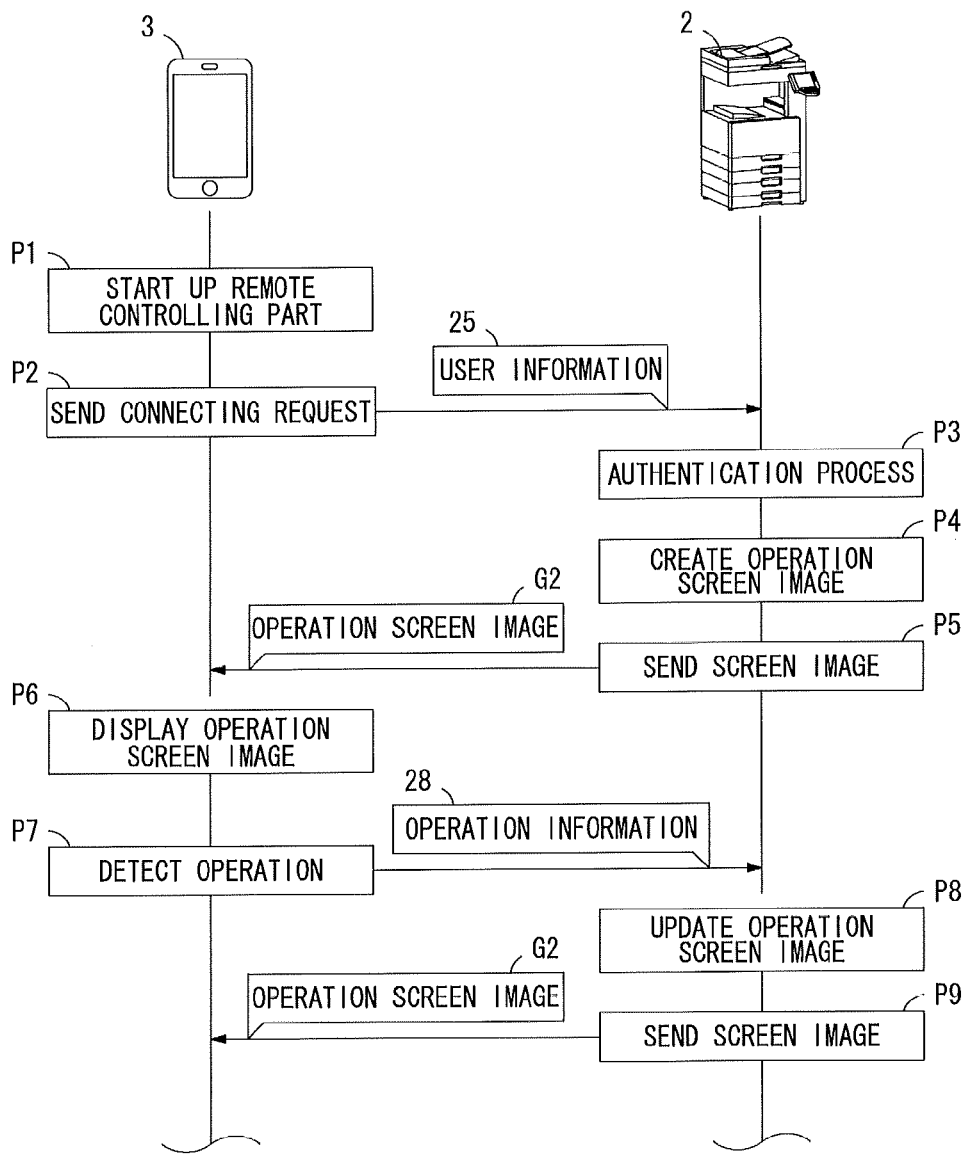
FIG. 13 is an exemplary sequential procedure of the process performed by the communication terminal and the information processing device in cooperation with each other.

FIG. 13 is a flow diagram explaining an exemplary sequential procedure to enable the communication terminal 3 to operate the information processing device 2 by remote control. Upon start up of the remote controlling part 31 (process P1), the communication terminal 3 sends the connecting request to the information processing device 2 by establishing the short distance radio communication (process P2). The connecting request thereby sent contains the user information 25. As receiving the connecting request from the communication terminal 3, the information processing device 2 performs the authentication process in accordance with the user information 25 contained in the received connecting request (process P3). When the user of the communication terminal 3 is identified as the registered user as the result of the authentication, the information processing device 2 creates the operation screen image G2 for remote operation on the communication terminal 3 (process P4), and sends the created operation screen image G2 to the communication terminal 3 (process P5).

After sending the connecting request, the communication terminal 3 obtains the operation screen image G2 from the information processing device 2. The communication terminal 3 displays the obtained operation screen image G2 on the display unit 15 (process P6). So, the user is allowed to use the information processing device 2 by remote control using the communication terminal 3. As detecting the operation by the user in response to the operation screen image G2 (process P7), the communication terminal 3 sends the operation information 28 corresponding to the detected operation to the information processing device 2. With receipt of the operation information 28 corresponding to the operation made in response to the operation screen image G2 from the communication terminal 3, the information processing device 2 updates the operation screen image G2 (process P8), and sends the updated operation screen image G2 to the communication terminal 3 (process P9). Thus, the operation screen image G2 displayed with the communication terminal 3 may be updated. After this, every time that operation is made in response to the operation screen image G2 by the user, the process in P7 to P9 is repeatedly performed.

Figure 14:
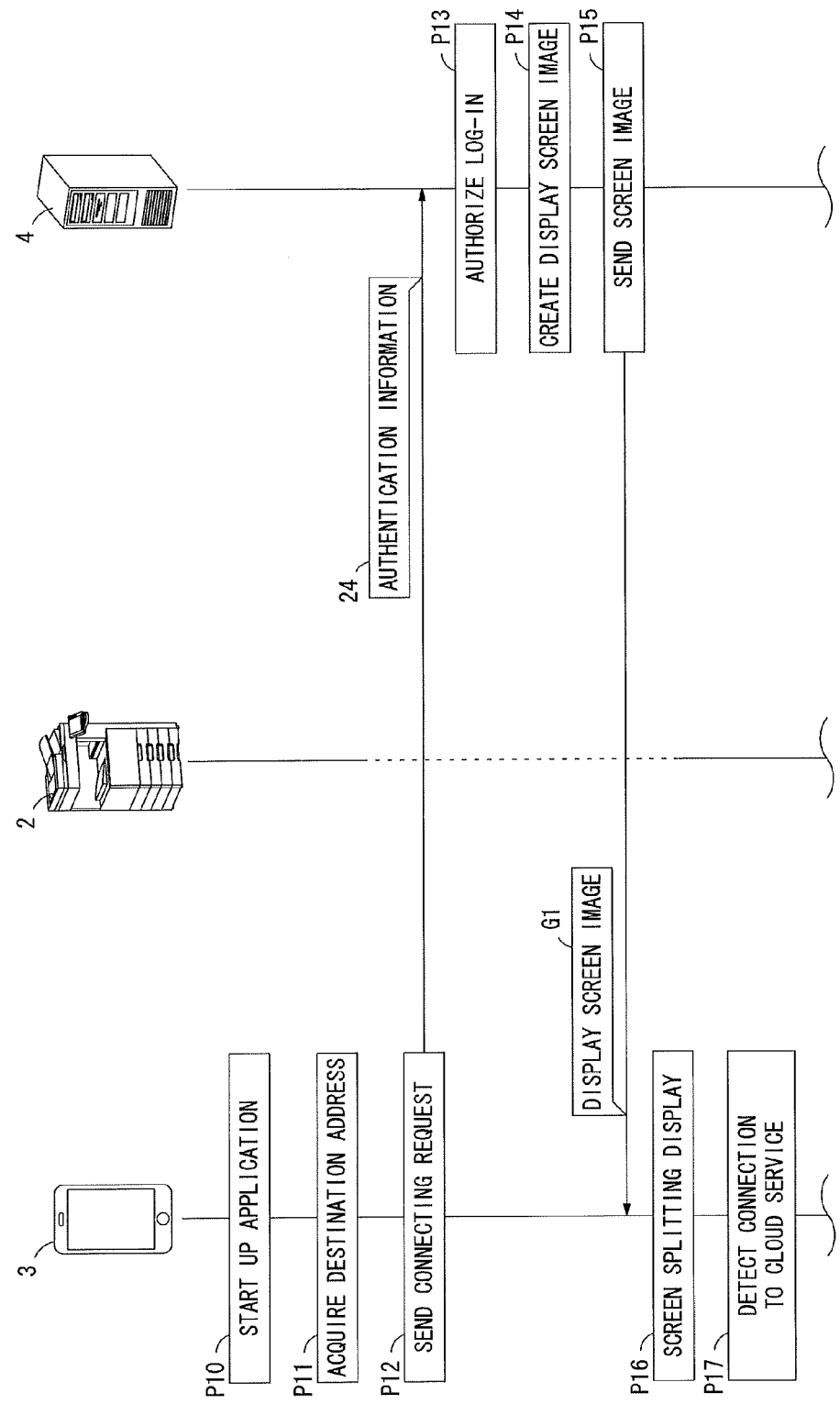
FIG. 14 is an exemplary sequential procedure of the process performed by the communication terminal and the information processing device in cooperation with each other.

FIGS. 14 to 17 are exemplary sequential procedures of the process performed by the communication terminal 3 and the information processing device 2 in cooperation with each other to use the cloud service. After enabling the communication terminal 3 to operate the information processing device 2 by remote control, the communication terminal 3 starts up the cloud service connecting application 30 as shown in FIG. 14 (process P10) to acquire the destination address 23 of the cloud service to which the communication terminal 3 connects (process P11). The communication terminal 3 accesses the service providing server 4 in accordance with the destination address 23, and sends the connecting request to the service providing server 4 (process P12). The connecting request thereby sent contains the authentication information 24 required for automatic log-in to the user-specific account. As receiving the authentication information 24 from the communication terminal 3, the service providing server 4 authorizes the log-in (process P13). The service providing server 4 then creates the display screen image G1 for using the cloud service and sends the created display screen image G1 to the communication terminal 3 (processes P14 and P15).

After the communication terminal 3 acquires the display screen image G1, the cloud service connecting application 30 displays the acquired display screen image G1 on the display unit 15. The remote controlling part 31 divides up the screen image in two sections to display so that both the display screen image G1 acquired by the cloud service connecting application 30 and the operation screen image G2 for remote operation may be displayed in parallel (process P16). With this split screen, the remote controlling part 31 detects that the cloud service connecting application 30 is connecting to the cloud service (process P17).

Figure 15:
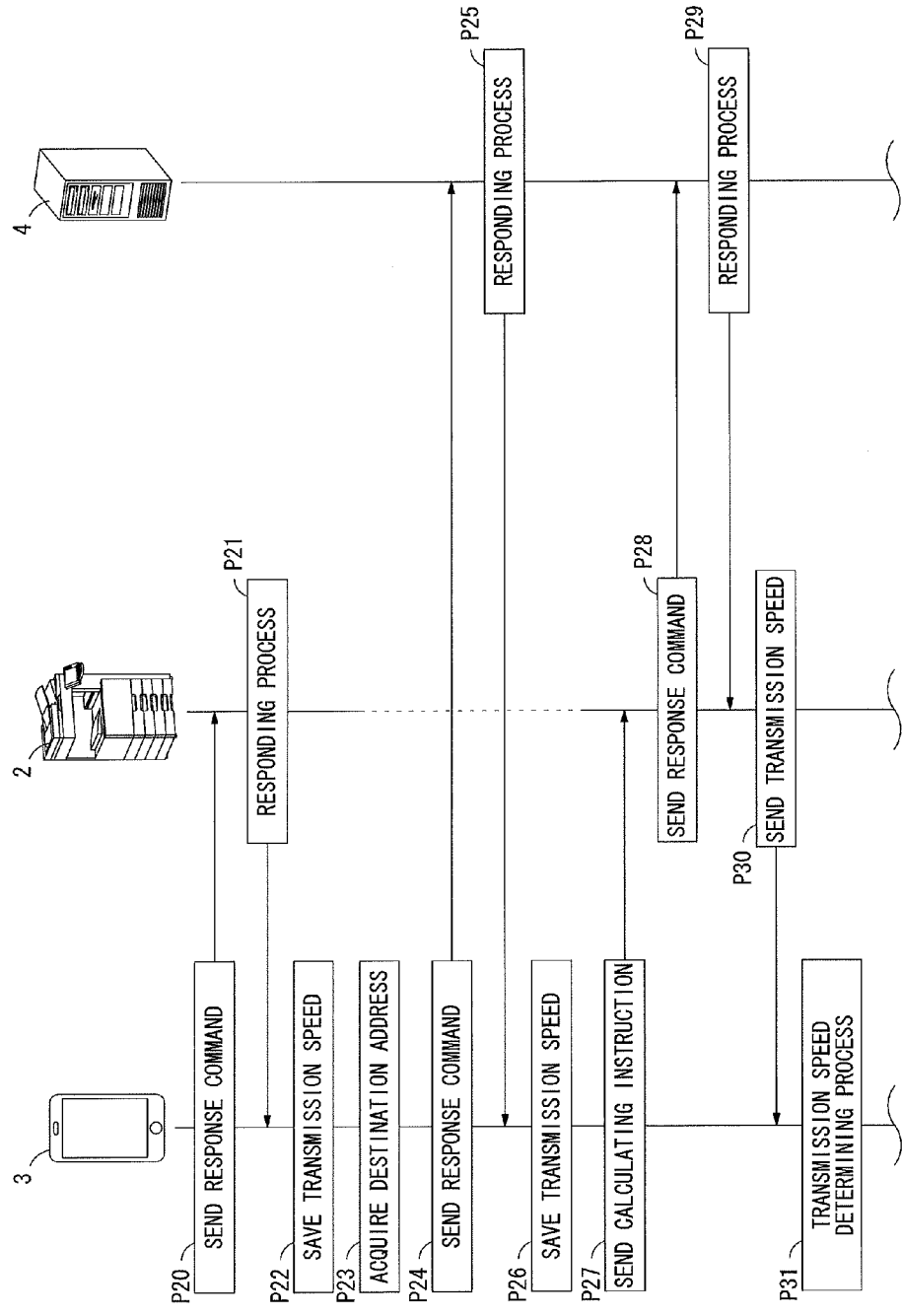
FIG. 15 is an exemplary sequential procedure of the process performed by the communication terminal and the information processing device in cooperation with each other.

Going on to FIG. 15, the remote controlling part 31 performs the process to calculate the transmission speeds V1 and V2. To be more specific, the communication terminal 3 sends the response command to the information processing device 2 at first (process P20), then receiving the response signal, which is returned in response to the responding process (process P21) on the information processing device 2. The communication terminal 3 saves the value of the transmission speed between the communication terminal 3 and the information processing device 2 (process P22). The communication terminal 3 then acquires the destination address 23 to which the cloud service connecting application 30 is connecting (process P23). The communication terminal 3 sends the response command to the service providing server 4 to which the cloud service connecting application 30 is connecting in accordance with the destination address 23 (process P24), then receiving the response signal, which is returned in response to the responding process (process P25) on the service providing server 4. The communication terminal 3 saves the value of the transmission speed between the communication terminal 3 and the service providing server 4 (process P26). The communication terminal 3 sends the calculating instruction of the transmission speed to the information processing device 2 (process P27). The information processing device 2 sends the response command to the service providing server 4 to which the cloud service connecting application 30 is connecting (process P28), then receiving the response signal, which is returned in response to the responding process (process P29) on the service providing server 4. The information processing device 2 calculates the transmission speed, the rate of direct data communication with the service providing server 4, with the response signal, and sends the obtained value to the communication terminal 3 (process P30). The communication terminal 3 performs transmission speed determining process based on the obtained value of the transmission speed, the rate of data communication in each path C1, C2 and C3 (process P31). In the transmission speed determining process, it is determined either the aforementioned first or second path realizes efficient data communication when uploading or downloading data between the information processing device 2 and the service providing server 4. If it is determined that direct data transmission and receipt to and from the service providing server 4 from the information processing device 2 is more efficient, the process moves on to FIGS. 16 and 17.

Figure 16:
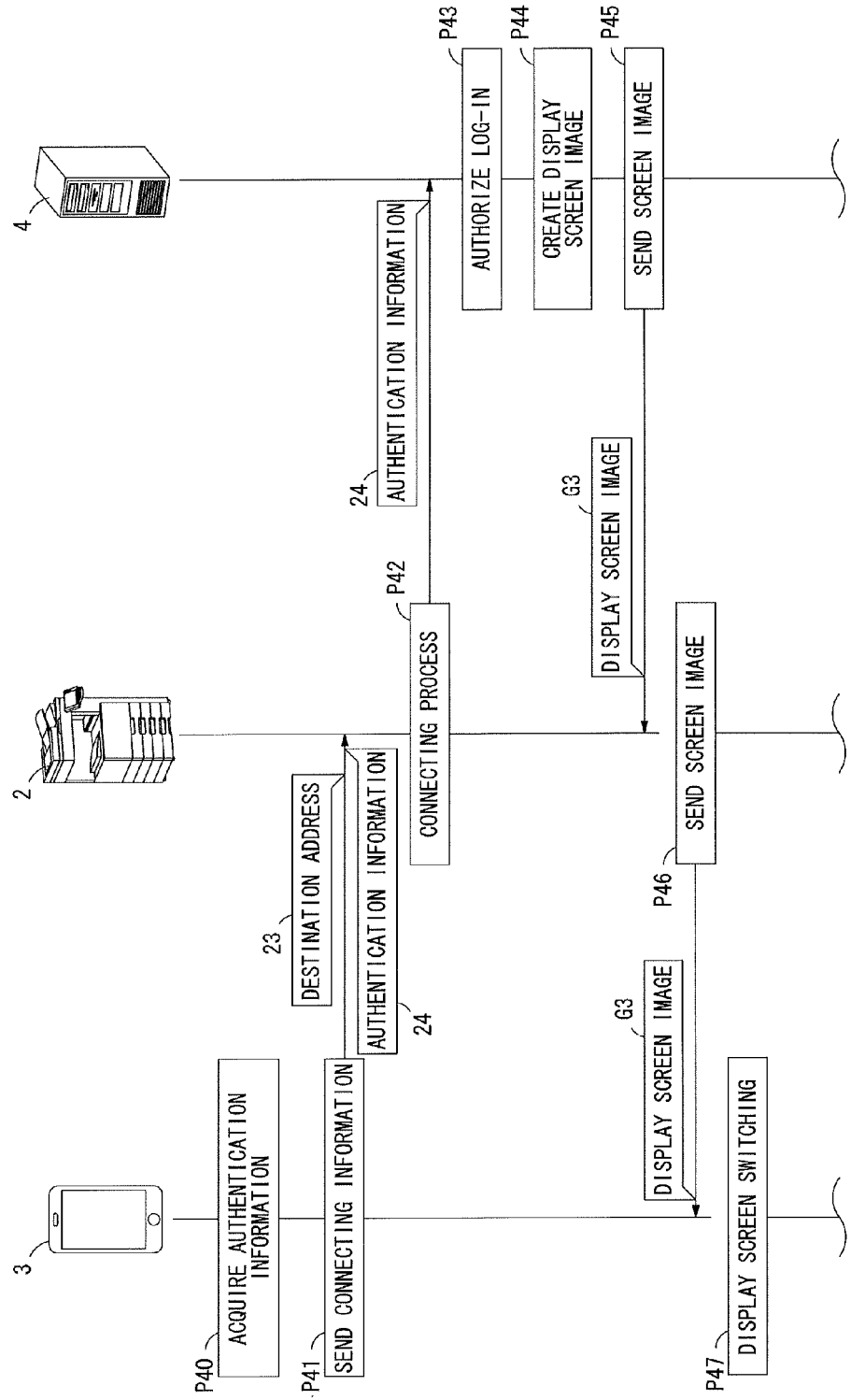
FIG. 16 is an exemplary sequential procedure of the process performed by the communication terminal and the information processing device in cooperation with each other.

Going to FIG. 16, the communication terminal 3 reads and acquires the authentication information 24 required for logging into the cloud service to which the cloud service connecting application 30 is connecting (process P40). The communication terminal 3 generates the connecting information containing the authentication information 24, and sends to the information processing device 2 (process P41). The connecting information thereby sent contains the destination address 23 for connecting to the service providing server 4 from the information processing device 2 besides the authentication information 24. When the display screen image G1 displayed by the cloud service connecting application 30 is not an initial screen that is shown soon after logging into the cloud service, the communication terminal 3 sends the access state information indicating the access state to the service providing server 4 in response to the display screen image G1 to the information processing device 2.

After receiving the connecting information, the information processing device 2 performs connecting process to the service providing server 4 (process P42). In the connecting process, the information processing device 2 sends the authentication information 24 received from the communication terminal 3 to the service providing server 4. If the access state information in response to the display screen image G1 is received from the communication terminal 3, the information processing device 2 accesses the service providing server 4 in accordance with the received information. As receiving the authentication information 24 from the information processing device 2, the service providing server 4 authorizes logging in (process P43). The service providing server 4 then creates the display screen image G3 for using the cloud service and sends the created display screen image G3 to the information processing device 2 (processes P44 and P45). The display screen image G3 thereby sent to the information processing device 2 shows the access state the same as that of the display screen image G1 displayed by the cloud service connecting application 30.

After receiving the display screen image G3 from the service providing server 4, the information processing device 2 sends the received display screen image G3 to the service providing server 4 (process P46). As already described, the display screen image G3 may be sent to the service providing server 4 by attaching the image 46 (see FIG. 9) indicating that the screen image is acquired by the information processing device 2 from the service providing server 4 to the margins of the display screen image G3. In response to receiving the display screen image G3 from the information processing device 2, the communication terminal 3 switches the display screen image 15a for using the cloud service from the display screen image G1 acquired by the cloud service connecting application 30 to the display screen image G3 acquired by the information processing device 2 (process P47). The display screen image G3 displayed with this screen image switching shows the access state the same as that in response to the display screen image G1 displayed until the screen image switching. As a result, the user is allowed to make operation from the same current operation state before screen image switching.

Figure 17:
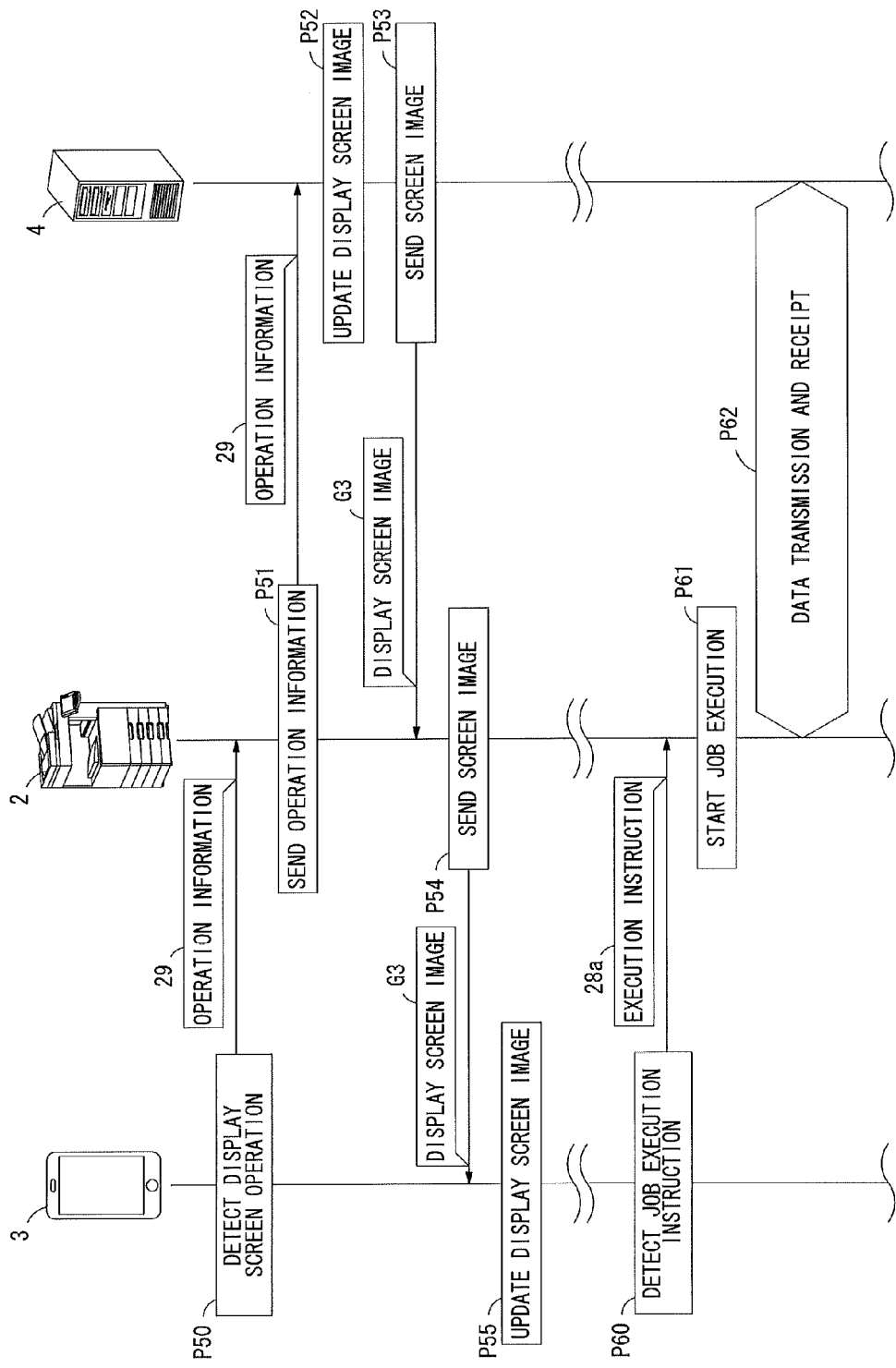
FIG. 17 is an exemplary sequential procedure of the process performed by the communication terminal and the information processing device in cooperation with each other.

Going to FIG. 17, after switching the screen image, the communication terminal 3 detects user's operation in response to the display screen image G3 acquired by the information processing device 2. In response detecting, the communication terminal 3 sends the operation information 29 corresponding to the user's operation to the information processing device 2 (process P50). With receipt of the operation information 29 in response to the display screen image G3 from the communication terminal 3, the information processing device 2 sends the received operation information 29 to the service providing server 4 (process P51). In response to receiving the operation information 29, the service providing server 4 updates the display screen image G3, and sends the updated display screen image G3 to the information processing device 2 (processes P52 and 53). After receiving the updated display screen image G3 from the service providing server 4, the information processing device 2 again sends the received display screen image G3 to the communication terminal 3 (process P54). Thus, the communication terminal 3 updates the display screen image G3 for using the cloud service, which is acquired by the information processing device 2 and displayed, to the current state that shows the changes made in response to user's operation (process P55).

After the update of the display screen image G3, the operation button 47 or 48 to start data upload or download may be pressed on the operation screen image G2 by the user. The communication terminal 3 then detects the operation as the job execution instruction, and sends a job execution instruction 28a to the information processing device 2 (process P60). The information processing device 2 starts executing a job in response to the job execution instruction 28a (process P61). With starting the job, the information processing device 2 transmits and receives data to and from the service providing server 4 (process P62). The information processing device 2 establishes direct data communication with the service providing server 4 through the aforementioned first path, thereby uploading or downloading the data.

Figure 18:
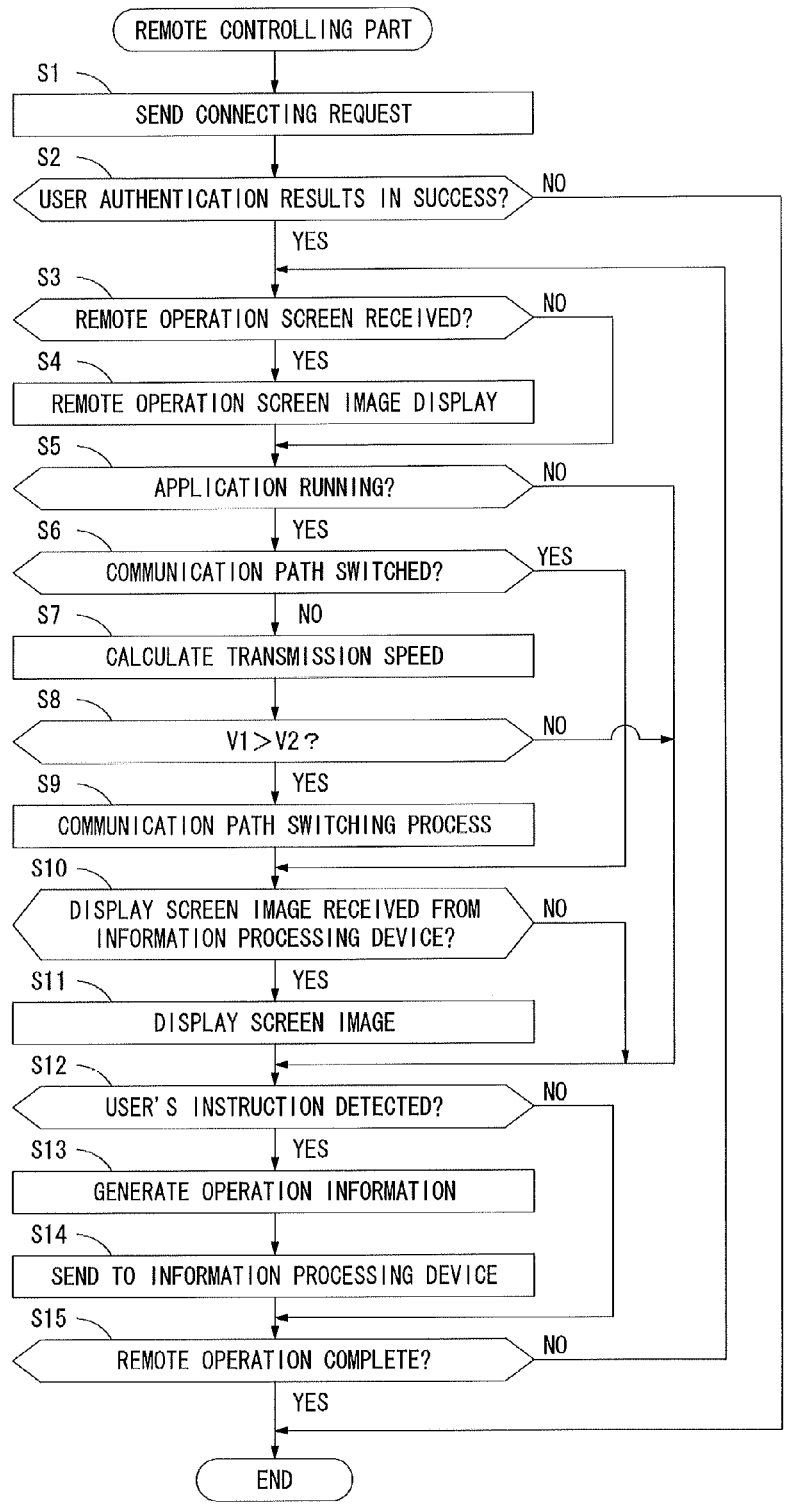
FIG. 18 is a flow diagram explaining an exemplary sequential procedure of the process performed on the communication terminal.

Detailed sequential procedure of the process performed respectively on the communication terminal 3 and the information processing device 2 is explained next. FIG. 18 is a flow diagram explaining an exemplary sequential procedure of the process performed on the communication terminal 3. This exemplary sequential procedure starts upon start up of the remote controlling part 31 on the communication terminal 3. As starting up on the communication terminal 3, the remote controlling part 31 sends the connecting request to the information processing device 2 (step S1). The information processing device 2 performs user authentication in response to the connecting request. The remote controlling part 31 then determines whether or not the user is successfully authenticated (step S2). When the user is not successfully authenticated (when a result of step S2 is NO), the process by the remote controlling part 31 is complete.

When the user is successfully authenticated (when a result of step S2 is YES), the remote controlling part 31 performs process in steps S3 to 15 repeatedly. More specifically, the remote controlling part 31 determines if the operation screen image G2 for remote operation is received from the information processing device 2 (step S3). In response to receiving the operation screen image G2, the remote controlling part 31 displays the received operation screen image G2 on the display unit 15 (step S4).

The remote controlling part 31 determines whether or not the cloud service connecting application 30 is running (step S5). If the cloud service connecting application 30 is not running (when a result of step S5 is NO), the process in steps S6 to S11 is skipped. If the cloud service connecting application 30 is running (when a result of step S5 is YES), the remote controlling part 31 determines if the communication path between the information processing device 2 and the service providing server 4 has already been switched from the second path to the first path (step S6). If it is determined that the communication path has already been switched to the first path (when a result of step S6 is YES), the process in steps S7 to S9 is skipped. When the communication path is switched yet and the communication path is still the second path (when a result of step S6 is NO), the remote controlling part 31 performs calculation of both the transmission speed V1, the rate of the data communication in the first path, and the transmission speed V2, the rate of the data communication in the second path (step S7). The remote controlling part 31 then compares the obtained values of transmission speeds V1 and V2, and determines if the transmission speed V1, the rate of the data communication in the first path, is faster than the transmission speed V2 (step S8). When the transmission speed V2, the rate of the data communication in the second path, is faster (when a result of step S8 is NO), the process in steps S9 to S11 is skipped. When the transmission speed V1, the rate of the data communication in the first path, is faster (when a result of step S8 is YES), the remote controlling part 31 performs communication path switching process (step S9). In the communication path switching process (step S9), the connecting information for connecting to the cloud service from the information processing device 2 is generated and sent to the information processing device 2.

The remote controlling part 31 then determines whether or not the display screen image G3 is received from the information processing device 2 (step S10). With the display screen image G3 received from the information processing device 2, the remote controlling part 31 performs display process of the display screen image G3 (step S11). The received display screen image may be the display screen image G3 which has been the first that had ever received since the information processing device 2 automatically logged into the cloud service. In such a case, the remote controlling part 31 switches the display screen image 15a for using the cloud service from the display screen image G1 acquired by the cloud service connecting application 30 to the display screen image G3 acquired by the information processing device 2.

The remote controlling part 31 then determines if the user's instruction is detected (step S12). With no user's instruction detected (when a result of step S12 is NO), the process in steps S13 and S14 is skipped. With the user's instruction detected (when a result of step S12 is YES), the remote controlling part 31 generates the operation information corresponds to the operation (step S13), and sends the generated operation information to the information processing device 2 (step S14).

The remote controlling part 31 determines whether or not operation to complete the remote operation is made by the user, for example (step S15). When the operation to complete is not made, the above-explained process is repeatedly performed by returning to step S3. When the operation to complete is made by the user, the process by the remote controlling part 31 is complete.

Figure 19:
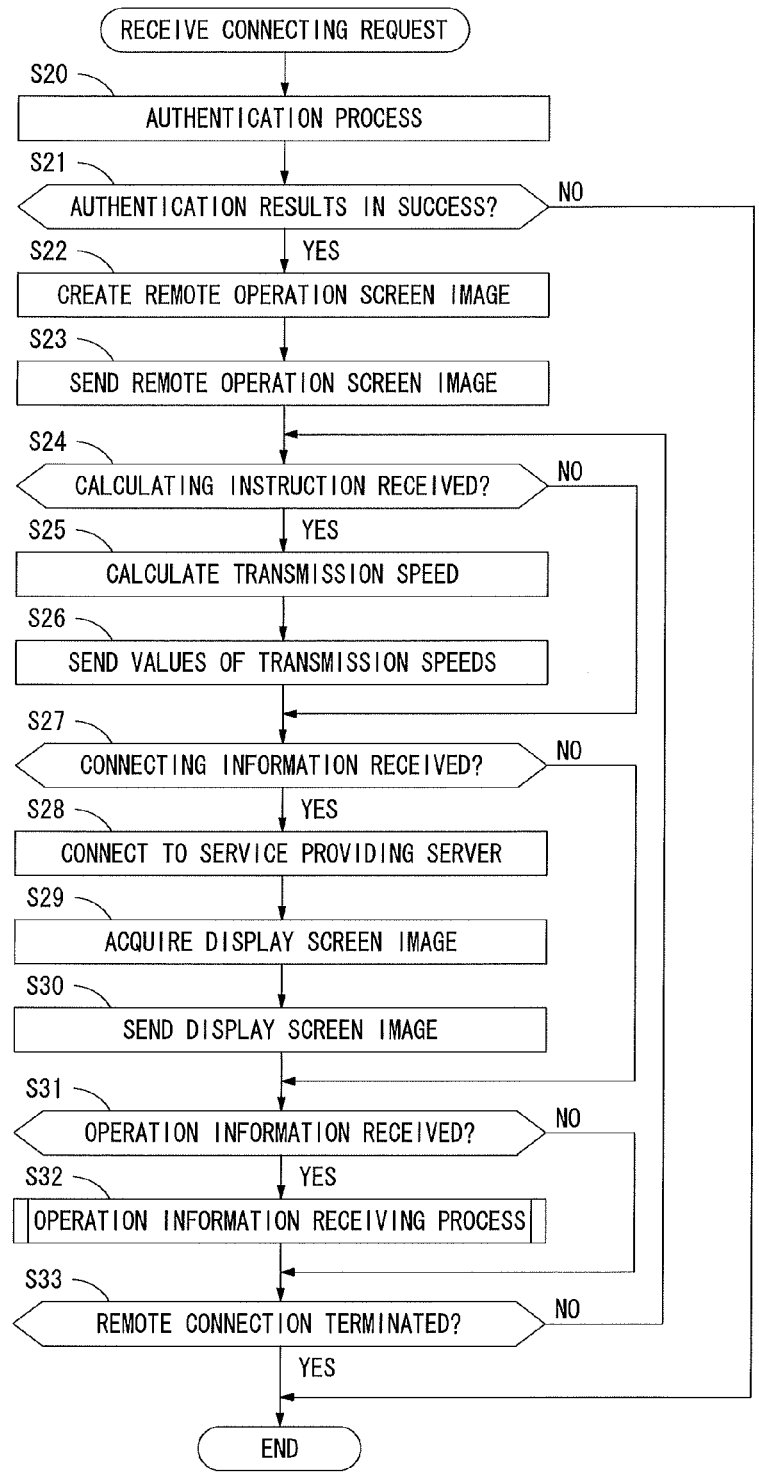
FIG. 19 is a flow diagram explaining an exemplary sequential procedure of the process performed on the information processing device.
Figure 20:
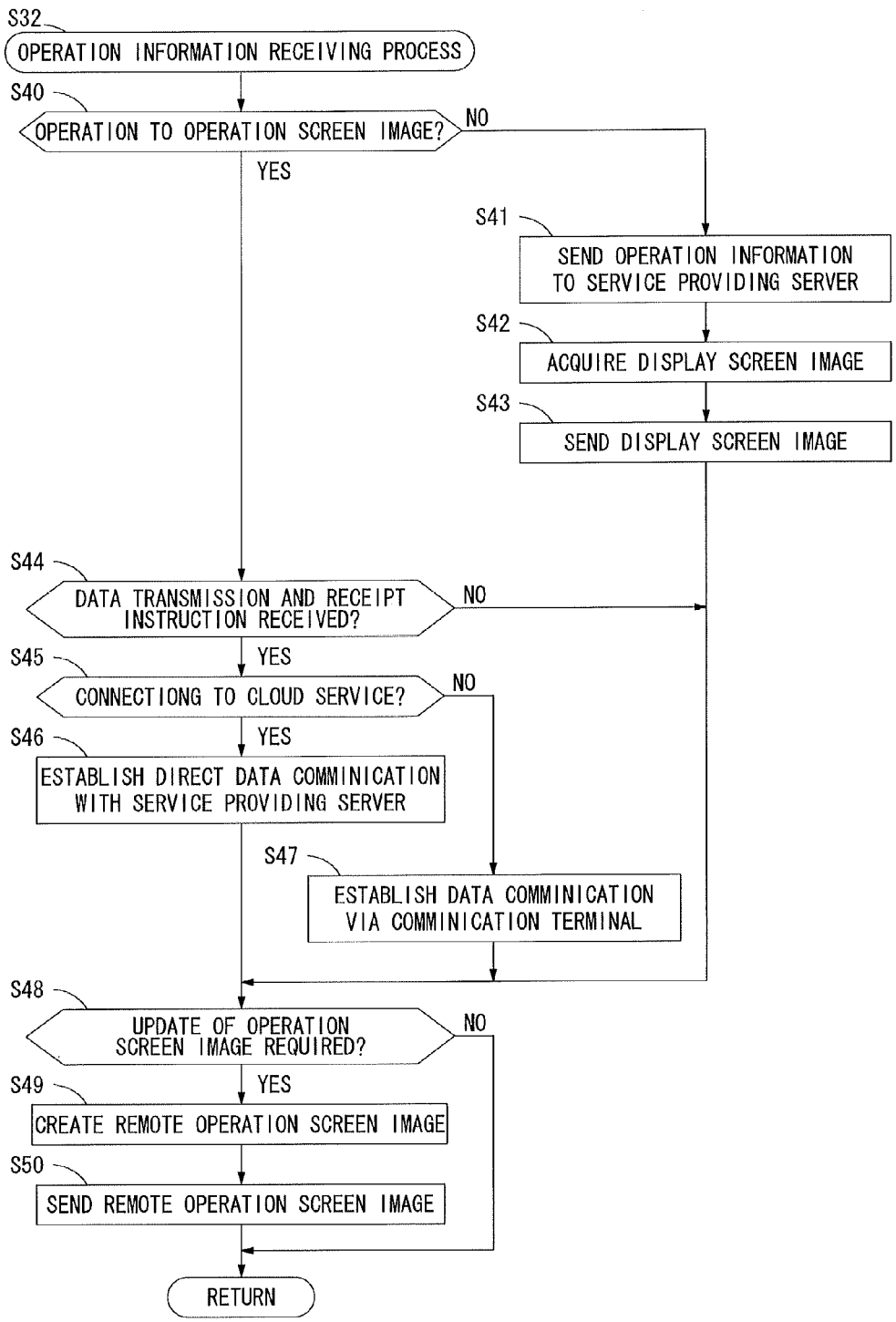
FIG. 20 is a flow diagram explaining an exemplary sequential procedure of the process performed on the information processing device.

FIGS. 19 and 20 are flow diagrams explaining exemplary sequential procedures of the process performed on the information processing device 2. This process is started upon the receipt by the information processing device 2 of the connecting request with the short distance radio communication from the communication terminal 3. This process is mainly performed by the controller 50 of the information processing device 2. As receiving the connecting request from the communication terminal 3, the controller 50 performs user authentication in accordance with the user information 25 contained in the received connecting request (step S20). When the user authentication results in failure (when a result of step S21 is NO), the controller 50 completes the process without performing later process. When the user authentication results in success (when a result of step S21 is YES), the controller 50 performs the process after step S22.

When the authentication results in success, the controller 50 creates the operation screen image G2 for remote operation on the communication terminal 3 (step S22), and sends the created operation screen image G2 to the communication terminal 3 (step S23). The controller 50 determines whether or not the calculating instruction of transmission speed is received from the communication terminal 3 (step S24). As the calculating instruction is received, the controller 50 calculates the transmission speed V1, the rate of direct data communication with the service providing server 4, in response to the calculating instruction (step S25), and sends the obtained value to the communication terminal 3 (step S26). With no calculating instruction is received (when a result of step S24 is NO), the controller 50 skips the process in steps S25 and S26.

The controller 50 determines if the connecting information is received from the communication terminal 3 (step S27). In response to receiving the connecting information, the controller 50 connects to the service providing server 4 over the network 5 in accordance with the received connecting information, and automatically logs into the user-specific account (step S28). The controller 50 acquires the display screen image G3 for using the cloud service from the service providing server 4 (step S29), and sends the acquired display screen image G3 to the communication terminal 3 (step S30). If no connecting information is received, the controller 50 skips the process in steps S28 to S30.

The controller 50 then determines whether or not the operation information is received from the communication terminal 3 (step S31). As receiving the operation information, the controller 50 performs operation information receiving process (step S32).

FIG. 20 is a flow diagram explaining the detailed exemplary sequential procedure of the operation information receiving process (step S32). As shown in FIG. 20, upon the start of the process, the controller 50 determines if the received operation information is the one corresponding to the operation made in response to the operation screen image G2 (step S40). When the received operation information is not the one corresponding to the operation made in response to the operation screen image G2 (when a result of step S40 is NO), the controller 50 sends the operation information to the service providing server 4 (step S41). The controller 50 then acquires the display screen image G3 updated based on the operation information from the service providing server 4 (step S42), and sends the display screen image G3 to the communication terminal 3 (step S43). The controller 50 moves on to the process in step S48.

When the received operation information is the one corresponding to the operation made in response to the operation screen image G2 (when a result of step S40 is YES), the controller 50 analyzes the received operation information, thereby determining whether or not the user's instruction is to specify data transmission and receipt to and from the service providing server 4 (step S44). If the operation is not to specify data transmission and receipt to and from the service providing server 4 (when a result of step S44 is NO), the controller 50 moves on to the process in step S48.

If the operation is to specify data transmission and receipt to and from the service providing server 4 (when a result of step S44 is YES), the controller 50 determines if it is connecting to the cloud service of the service providing server 4 (step S45). When it is connecting to the cloud service (when a result of step S45 is YES), the controller 50 establishes direct data communication with the service providing server 4, thereby uploading or downloading the data specified by the user (step S46). When it is not connecting to the cloud service (when a result of step S45 is NO), the controller 50 establishes indirect data communication with the service providing server 4 via the communication terminal 3, thereby uploading or downloading the data specified by the user (step S47). The controller 50 then moves on to the process in step S48.

The controller 50 determines whether or not update of the operation screen image G2 is required (step S48). If the update is required (when a result of step S48 is YES), the controller 50 updates the operation screen image G2 in accordance with the operation information (step S49), and sends the updated operation screen image G2 to the communication terminal 3 (step S50). With the operation information receiving process as described above, the screen image displayed with the communication terminal 3 is properly updated every time the user makes operation.

Referring back to the flow diagram of FIG. 19, the controller 50 does not perform the above-described operation information receiving process (step S32) when no operation information is received from the communication terminal 3. In this case, the controller 50 determines whether or not to terminate the remote connection with the short distance radio communication with the communication terminal 3 (step S33). If not terminating the remote connection, the controller 50 repeatedly performs the aforementioned process by returning to step S24. If terminating the remote connection, the process by the controller 50 is complete.

With the above-described process performed respectively on the communication terminal 3 and the information processing device 2, the user is allowed to use the information processing device 2 by remote control on the communication terminal 3. The remote controlling part 31 may be started up as the user uses the cloud service on the communication terminal 3. In such a case, both of the display screen image 15a for using the cloud service and the operation screen image 15b for remotely operating the information processing device 2 are displayed on the display unit 15. Thus, operation to upload the data to the cloud service or to download the data from the cloud service may be performed efficiently.

When the cloud service connecting application 30 and the remote controlling part 31 are brought into operation at the same time on the communication terminal 3, the remote controlling part 31 selects the faster path through which the data transmission and receipt between the information processing device 2 and the service providing server 4 at a faster rate is allowed. To be more specific, when it is more efficient to establish direct data communication between the information processing device 2 and the service providing server 4, the remote controlling part 31 switches the communication path between the information processing device 2 and the service providing server 4 to the first path through which direct data communication between the information processing device 2 and the service providing server 4 with each other is established. As a result, efficient data communication for data upload to the cloud service from the information processing device 2 or data download from the cloud service to the information processing device 2 may be realized.

In response the communication path switching, the communication terminal 3 automatically switches the display screen image 15a for using the cloud service from the display screen image G1 acquired by the cloud service connecting application 30 to the display screen image G3 acquired by the information processing device 2. The communication terminal 3 then sends the user's instruction made in response to the display screen image 15a to the information processing device 2. With this screen switching, the display screen image G1 acquired by the cloud service connecting application 30 is no longer displayed on the display unit 15. The user, therefore, does not have to care of the screen switching, and he or she is allowed to select a folder or a file properly.

As described above, the communication terminal 3 of the present preferred embodiment includes the remote controlling part 31 that acquires the operation screen image required for the user to perform remote operation of the information processing device 2 from the information processing device 2 through communication with the information processing device 2 and displays the acquired operation screen image on the display unit 15 in response to the user's instruction. The communication terminal 3 of the present preferred embodiment also includes the cloud service connecting application 30 that connects to the service providing server 4 providing the cloud service over the network 5 to acquire the display screen image G1 for using the cloud service from the service providing server 4 and displays the acquired display screen image G1 on the display unit 15 in response to the user's instruction. The remote controlling part 31 sends the connecting information for connecting to the service providing server 4 to the information processing device 2 as the cloud service connecting application 30 is connecting to the service providing server 4, and receives the display screen image G3 which is acquired by the information processing device 2 from the service providing server 4. In response to receiving the display screen image G3, the remote controlling part 31 switches the display screen image G1 displayed by the cloud service connecting application 30 on the display unit 15 to the display screen image G3 which is acquired by the information processing device 2 from the service providing server 4. The remote controlling part 31 then sends the user's instruction made in response to the display screen image G3 to the information processing device 2.

With the remote controlling part 31 and the cloud service connecting application 30, the operability for data communication between the information processing device 2 and the service providing server 4 providing the cloud service may be improved. More in detail, the communication terminal 3 sends the connecting information for connecting to the service providing server 4 to the information processing device 2 so that the user is allowed to save time for entering the connecting information to the information processing device 2. Moreover, the display screen image G1 displayed by the cloud service connecting application 30 on the display unit 15 may be automatically switched to the display screen image G3 which is acquired by the information processing device 2 from the service providing server 4. As a result, the user is only required to make operation in response to the same display screen image before and after the screen switching, and the operating confusion may be avoided. The user is allowed to make operation efficiently. For the screen switching, the display screen image G3 after the screen switching shows the access state of the user before the screen switching as described above. This results in greater improvement of operability.

As the cloud service connecting application 30 connects to the service providing server 4, the remote controlling part 31 of the present preferred embodiment obtains values of the transmission speed V1, the rate of direct data communication between the information processing device 2 and the service providing server 4, and the transmission speed V2, the rate of the data communication between the information processing device 2 and the service providing server 4 via the communication terminal 3, and compares the obtained values. When the transmission speed V1 is faster, the remote controlling part 31 sends the connecting information to the information processing device 2. More specifically, when the transmission speed V2, the rate of the data communication between the information processing device 2 and the service providing server 4 via the communication terminal 3, is faster than the transmission speed V1, the connecting information is not sent to the information processing device 2, and the data is transmitted and received indirectly between the information processing device 2 and the service providing server 4 via the communication terminal 3. According to the present preferred embodiment, data communication may be established between the information processing device 2 and the service providing server 4 through the path that realizes efficient communication.

The communication terminal 3 repeatedly performs the process to obtain the values of the transmission speeds V1 and V2 and compare the values on a regular basis. As a result, the communication path may be switched to the one that realizes more efficient data communication in real time even when any problem such as a network trouble is occurred, for example.

The connecting information sent from the communication terminal 3 to the information processing device 2 contains the destination address 23 for access to the service providing server 4 over the network 5 and the authentication information 24 for logging into the service providing server 4. The information processing device 2 thereby received the connecting information from the communication terminal 3 starts the network connection by referring to the connecting information, thereby automatically connecting to the service providing server 4 and automatically logging into the user-specific account.

In the present preferred embodiment, the display screen image 15*a* is switched by the remote controlling part 31. In response to switching, the display screen image G3 to which the image 46 indicating that the screen image is acquired by the information processing device 2 from the service providing server 4 is attached on the display unit 15 of the communication terminal 3. The user is, therefore, allowed to know that the display screen image G3 displayed on the display unit 15 is acquired by the information processing device 2.

As described above, the operability of data communication between the information processing device and the service providing server providing the cloud service may be improved. Moreover, the user is allowed to transmit and receive data efficiently with operating the communication terminal.

MODIFICATIONS

While the preferred embodiment of the present invention has been described above, the present invention is not limited to the preferred embodiment. Various modifications may be applied to the present invention.

In the present preferred embodiment described above, the information processing device 2 is shown to be one of MFPs with multiple functions such as scan function, print function and box function, for example. The information processing device of the present invention is not necessarily the device such as the MFPs including multiple functions. To be more specific, the information processing device of the present invention may be a device with single function such as devices including a specialized scan device with a function to send image data generated by reading a document to outside over the network 5, or a specialized fax device with a function to produce a printed output based on the image data received from the outside over the network 5. Alternatively, the information processing device may be a network storage connected to a network such as LAN in the office.

In the above-described present preferred embodiment, the communication terminal 3 and the information processing device 2 establish short distance radio communication such as NFC (Near Field Communication). It is not limited to the short distance radio communication. More specifically, the user terminal 3 and the information processing device 2 may establish communication over the network such as LAN.

In the above-described present preferred embodiment, values of the transmission speed V1, the rate of direct data communication between the information processing device 2 and the service providing server 4, and the transmission speed V2, the rate of data communication between the information processing device 2 and the service providing server 4 via the communication terminal 3, are obtained and compared. When the transmission speed V1 is faster, the communication terminal 3 establishes connection that enables direct data communication between the information processing device 2 and the service providing server 4. It, however, is not limited to the case where the transmission speed V1 is faster. The connection that enables direct data communication between the information processing device 2 and the service providing server 4 may be established when both the cloud service connecting application 30 and the remote controlling part 31 are brought into operation at the same time.

The communication terminal 3 is not limited to the device such as the tablet terminal or the smart phone. The communication terminal 3 may be formed from a computer such as a generally-used personal computer (PC).

What is claimed is:

1. An information processing system comprising a communication terminal and an information processing device that allow communication therebetween, wherein said communication terminal includes:
a display part on which a variety of information is displayed to a user; and
a communication terminal controller configured to:
acquire an operation screen image, with which the user makes remote operation of said information processing device, by establishing communication with said information processing device in response to user's instruction, and cause the acquired operation screen image to be displayed on said display part,
connect to a service providing server providing a cloud service over a network, and acquire a display screen image for using said cloud service from said service providing server in response to user's instruction, thereby causing the acquired display screen image to be displayed on said display part together with the operation screen image displayed, and
send connecting information for connecting to said service providing server to said information processing device as said communication terminal controller is connecting to said service providing server,
said information processing device includes an information processing device controller configured to:
connect to said service providing server over the network, establish communication with said service providing server in accordance with said connecting information received from said communication terminal, and acquire a second display screen image for using said cloud service from said service providing server in response to user's instruction; and
send the second display screen image acquired from said service providing server to said communication terminal, wherein
said communication terminal controller is further configured to switch the display screen image displayed by said communication terminal controller on said display part to the second display screen image acquired by said information processing device from said service providing server when receiving the display screen image acquired from said service providing server by said information processing device, and send user's instruction given to the switched second display screen image to said information processing device.

2. The information processing system according to claim 1, wherein
said communication terminal controller is configured to, as said communication terminal controller connects to said service providing server, obtain values of a transmission speed of direct data communication between said information processing device and said service providing server and a transmission speed of data communication between said information processing device and said service providing server via said communication terminal to compare the obtained values, and send said connecting information to said information processing device when the former transmission speed is faster.

3. The information processing system according to claim 1, wherein
said information processing device controller is further configured to directly transmit and receive data to and from said service providing server to execute a job without connecting via said communication terminal when an instruction on data transmission and receipt to and from said service providing server is received from said communication terminal as said information processing device controller is connecting to said service providing server.

4. The information processing system according to claim 1, wherein
said connecting information contains an address required for an access to said service providing server over the network and authentication information required for log-in to said service providing server.

5. The information processing system according to claim 1, wherein
said communication terminal controller is configured to send access state information indicating access state where said service providing server is accessed by said communication terminal controller to said information processing device while sending said connecting information to said information processing device.

6. The information processing system according to claim 1, wherein
with display screen image switching by said communication terminal controller, said display part displays the second display screen image and attaches an image indicating that the screen image is acquired by said information processing device from said service providing server.

7. A communication terminal capable of establishing communication with an information processing device to and from which data is transmitted and received, comprising:
a display part on which a variety of information is displayed to a user; and
a controller configured to:
acquire an operation screen image, with which the user makes remote operation of said information processing device, by establishing communication with said information processing device in response to user's instruction, and cause the acquired operation screen image to be displayed on said display part,
connect to a service providing server providing a cloud service over a network, and acquire a display screen image for using said cloud service from said service providing server in response to user's instruction, thereby causing the acquired display screen image to be displayed on said display part together with the operation screen image displayed, and
send, as said controller is connecting to said service providing server, sends connecting information for connecting to said service providing server to said information processing device to cause said information processing device to establish communication with said service providing server, thereby acquiring a second display screen image for using said cloud service from said information processing device to switch the display screen image displayed on said display part to the second display screen image acquired by said information processing device from said service providing server, and send user's instruction given to the switched second display screen image to said information processing device.

8. The communication terminal according to claim 7, wherein
said controller is configured to, as said controller is connecting to said service providing server, obtain values of a transmission speed of direct data communication between said information processing device and said service providing server and a transmission speed of data communication between said information processing device and said service providing server via said communication terminal to compare the obtained values, and send said connecting information to said information processing device when the former transmission speed is faster.

9. The communication terminal according to claim 7, wherein
said connecting information contains an address required for an access to said service providing server over the network and authentication information required for log-in to said service providing server.

10. The communication terminal according to claim 7, wherein
said controller is configured to send access state information indicating access state where said service providing server is accessed by said controller to said information processing device while sending said connecting information to said information processing device.

11. The communication terminal according to claim 7, wherein
said controller is configured to cause said information processing device to directly transmit and receive data to and from said service providing server without connecting via said communication terminal when an instruction on data transmission and receipt between said information processing device and said service providing server is given by the user with the second display screen image acquired by said information processing device being displayed, to which the display screen image on said display unit is switched by said controller after acquiring the second display screen image for using said cloud service from said information processing device.

12. An information processing device capable of establishing communication with a communication terminal, said communication terminal being connected to a service providing server providing a cloud service, comprising a controller configured to:
connect to said service providing server over a network, establish communication with said service providing server in accordance with connecting information, said connecting information being received from said communication terminal as said communication terminal is connecting to said service providing server, and acquire a display screen image for using said cloud service from said service providing server in response to user's instruction;
create an operation screen image for remote operation of the information processing device by said communication terminal and send the operation screen image to said communication terminal, and send the display screen image acquired by said controller from said service providing server to said communication terminal by establishing communication with said communication terminal; and
transmit and receive data to and from said service providing server through said controller to execute a job without connecting via said communication terminal when an instruction on data transmission and receipt to and from said service providing server is received from said communication terminal as said controller is connecting to said service providing server.

13. The information processing device according to claim 12, wherein
said controller is configured to automatically log into said service providing server based on authentication information, which is contained in said received connecting information, while connecting to said service providing server.

14. The information processing device according to claim 12, wherein
said controller is configured to connect to said service providing server based on access state information received together with said connecting information from said communication terminal while connecting to said service providing server, thereby connecting to said service providing server with maintaining access state the same as a state where said communication terminal is accessing said service providing server.

15. The information processing device according to claim 12, wherein
said controller is configured to attach an image indicating that the screen image is acquired by said information processing device from said service providing server to the display screen image acquired by said controller from said service providing server while sending the display screen image to said communication terminal.

16. A non-transitory computer readable recording medium on which a program is recorded, said program executable on a communication terminal capable of connecting to a service providing server providing a cloud service by running an application, said program causing said communication terminal to establish communication with an information processing device, to and from which data is transmitted and received, thereby remotely controlling said information processing device, said program executed on said communication terminal to function as a system comprising:
a screen image controlling part for acquiring an operation screen image, with which a user makes remote operation of said information processing device, by establishing communication with said information processing device, and causing the acquired operation screen image to be displayed on a predetermined display part;
a connection detecting part for detecting that said application is connecting to said service providing server; and
a communication path switching part for sending connecting information for connecting to said service providing server to said information processing device, and causing said information processing device to establish communication with said service providing server as said application is connecting to said service providing server, wherein
said screen image controlling part, as said information processing device starts communication with said service providing server in response to sending said connecting information to said information processing device by said communication path switching part, acquires a second display screen image for using said cloud service from said information processing device to switch a first display screen image for using said cloud service, which is displayed on said display part by said application, to the second display screen image acquired from said information processing device, and sends user's instruction given to the switched second display screen image to said information processing device.

17. The non-transitory computer readable recording medium according to claim 16, said program executed on said communication terminal to function as the system further comprising:
a transmission speed determining part for obtaining values of a transmission speed of direct data communication between said information processing device and said service providing server and a transmission speed of data communication between said information processing device and said service providing server via said communication terminal to compare the obtained values as said application is running on said communication terminal and connecting to said service providing server, wherein said communication path switching part is caused to send said connecting information to said information processing device only if said transmission speed determining part determines that the transmission speed of direct data communication between said information processing device and said service providing server is faster than the transmission speed of data communication between said information processing device and said service providing server via said communication terminal.

18. The non-transitory computer readable recording medium according to claim 16, wherein said communication path switching part sends said connecting information to said information processing device, containing an address required for an access to said service providing server over a network and authentication information required for log-in to said service providing server.

19. The non-transitory computer readable recording medium according to claim 16, wherein said communication path switching part sends access state information indicating access state where said service providing server is accessed by said application to said information processing device while sending said connecting information to said information processing device.

20. The non-transitory computer readable recording medium according to claim 16, wherein said screen image controlling part causes said information processing device to directly transmit and receive data to and from said service providing server without connecting via said communication terminal when an instruction on data transmission and receipt between said information processing device and said service providing server is given by a user with the second display screen image acquired from said information processing device being displayed, to which the display screen image on said display unit is switched by said application after acquiring the second display screen image for using said cloud service from said information processing device.

21. The information processing system according to claim 1, wherein said information processing device controller is configured to:

determine an operation status on each screen image as the operation screen image, with which the user makes remote operation of said information processing device, and the second display screen image received from said information processing device and switched by said communication terminal controller are both displayed on said display part of said communication terminal, thereby determining whether or not data processing is allowed, and send a process start button image to said communication terminal when determining the data processing is allowed; and said communication terminal controller is configured to:

cause said process start button image received from said information processing device to be displayed on said display part, and cause a start instruction to start the data processing to be sent to said information processing device when said displayed process start button is pressed.

22. The information processing system according to claim 21, wherein said information processing device controller is configured to:

determine whether a predetermined file is selected on the operation screen image for remote operation, determine that upload of a predetermined file to said service providing server is allowed when the information processing device controller determines the predetermined file is selected on the operation screen image for remote operation, and send, to said communication terminal, said process start button image to start upload of the predetermined file to said service providing server.

23. The information processing system according to claim 21, wherein said information processing device controller is configured to:

determine whether a predetermined file is selected on the switched second display screen image, determine whether a predetermined storage part is selected on the operation screen image for remote operation, determine that download of the predetermined file from said service providing server to the predetermined storage part is allowed when the information processing device controller determines that the predetermined file is selected on the switched second display screen image and the predetermined storage part is selected on the operation screen image for remote operation, and send, to said communication terminal, said process start button image to start download of the file from said service providing server to said predetermined storage part.

24. The communication terminal according to claim 7, wherein said controller is configured to:

acquire a process start button image to start the data processing from said information processing device as the operation screen image, with which the user makes remote operation of said information processing device, and the second display screen image received from said information processing device and switched by said communication terminal controller are both displayed on said display part, cause said process start button image acquired from said information processing device to be displayed on said display part, and send a start instruction to start the data processing to said information processing device when said displayed process start button image is pressed.

25. The communication terminal according to claim 24, wherein said controller is configured to:

acquire said process start button image to start upload of a predetermined file to said service providing server from said information processing device when the predetermined file is selected on the operation screen image for remote operation.

26. The communication terminal according to claim 24, wherein said controller is configured to:

acquire said process start button image to start download of a predetermined file from said service providing server to a predetermined storage part from said information processing device when the predetermined file is selected on the switched second display screen image and the predetermined storage part is selected on the operation screen image for remote operation.

27. The information processing device according to claim 12, wherein said controller is configured to:

determine an operation status on each screen image as the operation screen image, with which the user makes remote operation of said information processing device, and the second display screen image received from said information processing device and switched by said communication terminal controller are both displayed on said display part of said communication terminal, thereby determining whether or not data processing is allowed, send a process start button image to start the data processing to said communication terminal when determining the data processing is allowed, and receive a start instruction to start the data processing from said communication terminal when said process start button image is pressed.

28. The information processing device according to claim 27, wherein said controller is configured to:

determine whether a predetermined file is selected on the operation screen image for remote operation, determine that upload of the predetermined file to said service providing server is allowed when the controller determines the predetermined file is selected on the operation screen image for remote operation, and send, to said communication terminal, said process start button image to start upload of the predetermined file to said service providing server.

29. The information processing device according to claim 27, wherein said controller is configured to:

determine whether a predetermined file is selected on the switched second display screen image, determine whether a predetermined storage part is selected on the operation screen image for remote operation, determine that download of the predetermined file from said service providing server to the predetermined storage part is allowed when the information processing device controller determines that the predetermined file is selected on the switched second display screen image and the predetermined storage part is selected on the operation screen image for remote operation, and send, to said communication terminal, said process start button image to start download of the file from said service providing server to said predetermined storage part.

30. The non-transitory computer readable recording medium according to claim 16, wherein said screen image controlling part acquires a process start button image to start the data processing from said information processing device as the operation screen image, with which the user makes remote operation of said information processing device, and the second display screen image received from said information processing device and switched by said screen image controlling part are both displayed on said display part, causes said process start button image acquired from said information processing device to be displayed on said display part, and sends a start instruction to start the data processing to said information processing device when said displayed process start button image is pressed.

31. The non-transitory computer readable recording medium according to claim 30, wherein said screen image controlling part acquires said process start button image to start upload of a predetermined file to said service providing server from said information processing device when the predetermined file is selected on the operation screen image for remote operation.

32. The non-transitory computer readable recording medium according to claim 30, wherein said screen image controlling part acquires said process start button image to start download of a predetermined file from said service providing server to a predetermined storage part from said information processing device when the predetermined file is selected on the switched second display screen image and the predetermined storage part is selected on the operation screen image for remote operation.

* * * * *